(12) United States Patent
Tomioka

(10) Patent No.: US 7,715,343 B2
(45) Date of Patent: May 11, 2010

(54) RADIO TERMINAL

(75) Inventor: Tazuko Tomioka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 637 days.

(21) Appl. No.: 11/499,669

(22) Filed: Aug. 7, 2006

(65) Prior Publication Data

US 2007/0042733 A1 Feb. 22, 2007

(30) Foreign Application Priority Data

Aug. 17, 2005 (JP) .............................. 2005-236758

(51) Int. Cl.
*H04W 4/00* (2009.01)
(52) U.S. Cl. ................... 370/329; 370/328; 370/450; 455/450; 455/452.1; 455/423
(58) Field of Classification Search ................ 455/450, 455/452, 423; 370/328, 329, 450
See application file for complete search history.

(56) References Cited

U.S. PATENT DOCUMENTS

| | | | | |
|---|---|---|---|---|
| 7,263,333 | B2 * | 8/2007 | Roberts | 455/67.13 |
| 2004/0047324 | A1 * | 3/2004 | Diener | 370/338 |
| 2006/0030318 | A1 * | 2/2006 | Moore et al. | 455/434 |
| 2006/0084444 | A1 * | 4/2006 | Kossi et al. | 455/450 |
| 2006/0088010 | A1 * | 4/2006 | Buchwald et al. | 370/338 |

FOREIGN PATENT DOCUMENTS

| | | |
|---|---|---|
| JP | 08-288888 | 11/1996 |
| JP | 2000-307551 | 11/2000 |
| JP | 2002-246961 | 8/2002 |
| JP | 2003-037529 | 2/2003 |
| JP | 3583962 | 8/2004 |
| JP | 2005-523616 | 8/2005 |

OTHER PUBLICATIONS

Tazuko Tomioka, "Radio Receiver and Radio Receiving Method", U.S. Appl. No. 11/356,956, filed Feb. 21, 2006.
IEEE 802.15.3a Standardization Contribution 15-04-140-12 (Mar. 2005).
Notification of Reasons for Rejection for Application No. 2005-236758, Japanese Patent Office, mailed Jan. 20, 2009.

* cited by examiner

*Primary Examiner*—Vincent P Harper
*Assistant Examiner*—Michael Irace
(74) *Attorney, Agent, or Firm*—Finnegan, Henderson, Farabow, Garrett & Dunner, L.L.P.

(57) ABSTRACT

There is provided with a radio terminal which carries out data transmission using frequency bands licensed to other licensed radio terminals, including: a judging section configured to carry out a modulation analysis on a radio signal for each frequency band to judge whether the radio signal is a radio signal from a licensed radio terminal or not; a selection section configured to select a plurality of frequency bands; a schedule generation section configured to generate a schedule for intermittent data transmission; a data transmission section configured to transmit data according to the schedule; a carrier sensing section configured to carry out carrier sensing on a frequency band in which data is transmitted before data transmission for each the intermittent data transmission; and a control section configured to stop, when a radio signal from a licensed radio terminal is detected in a certain frequency band, data transmission using at least the certain frequency band.

14 Claims, 19 Drawing Sheets

FREQUENCY BAND OCCUPIED BY LICENSED TERMINAL

FREQUENCY BAND POSSIBLY AVAILABLE TO COGNITIVE RADIO SET

TRANSMISSION FREQUENCY BAND SELECTED BY COGNITIVE RADIO SET

RADIO TERMINAL

CROSS-REFERENCE TO RELATED APPLICATIONS

This application is based upon and claims the benefit of priority from the prior Japanese Patent Applications No. 2005-236758 filed on Aug. 17, 2005, the entire contents of which are incorporated herein by reference.

BACKGROUND OF THE INVENTION

1. Field of the Invention

The present invention relates to a radio terminal which transmits data using a plurality of frequency bands including frequency bands preferentially licensed to other radio terminals.

2. Related Art

With the development of an information-oriented society, communication means available in familiar scenes are becoming drastically widespread and there is also a remarkable increase in a communication capacity. In order to increase the communication capacity, frequency bands used for specific applications are often made available for different applications. For example, in current general radio communications, it is stipulated by law that specific frequency bands should be used exclusively for specific applications, but several frequency bands are already open to a plurality of applications. In the future, a very wide band will be possibly made open to the public so as to be used together with other applications exclusively for small power short-distance communications such as UWB (Ultra-wideband).

Furthermore, a study of a scheme called "cognitive radio" has been started whereby a frequency band licensed to a specific system is allowed to be made available to an unlicensed radio terminal exclusively for places and times unoccupied by the specific system (see, for example, Japanese Patent No. 3583962).

A basic concept of the cognitive radio is to scan a potential band to be used, detect its status of use and use the band if the band is unoccupied by a system licensed to the band. Considering the speed enhancement and use of increasingly wider bandwidths in radio communications in recent years, it is anticipated that the ability to scan quite a wide band and determine to use a band that can satisfy demanded performance will be required.

As described above, a radio terminal which carries out communication using cognitive radio (hereinafter, referred to as a "cognitive radio set") detects and uses an unoccupied frequency band licensed to other systems. Therefore, in the case where a cognitive radio set uses a certain frequency band, there is a problem that when a licensed radio terminal which is an original user of the frequency band (hereinafter referred to as a "licensed terminal") starts to use the frequency band, the cognitive radio set must immediately stop the use of the frequency band and suppress the influences on data transmission to the licensed terminal.

Furthermore, when the use of the scheduled frequency band is stopped along with the start of a communication of the licensed terminal, continuity of the communication on the cognitive radio set side is not guaranteed, which results in problems that necessary file transfers cannot be completed, QoS (Quality of Service) of an isochronal communication cannot be guaranteed and so on.

SUMMARY OF THE INVENTION

According to an aspect of the present invention, there is provided with a radio terminal which carries out data transmission using a plurality of frequency bands including frequency bands licensed to other licensed radio terminals, comprising: a detection section configured to detect a radio signal for each frequency band; a judging section configured to carry out a modulation analysis on the detected radio signal to judge whether the radio signal is a radio signal from a licensed radio terminal or not; a selection section configured to select a plurality of frequency bands to be used for data transmission based on the judgment result; a schedule generation section configured to generate a schedule for intermittent data transmission using the plurality of selected frequency bands; a data generation section configured to generate data for the intermittent data transmission; a data transmission section configured to transmit the generated data according to the schedule; a carrier sensing section configured to carry out carrier sensing on a frequency band in which data is transmitted before data transmission for each the intermittent data transmission; and a control section configured to stop, when the carrier sensing result shows that a radio signal from a licensed radio terminal is detected in a certain frequency band, data transmission using at least the certain frequency band.

DETAILED DESCRIPTION OF THE INVENTION

Hereafter, an embodiment of the present invention will be described.

FIG. 1 to FIG. 4 illustrate an embodiment of the present invention in a case where frequency hopping is used.

Figure 1:
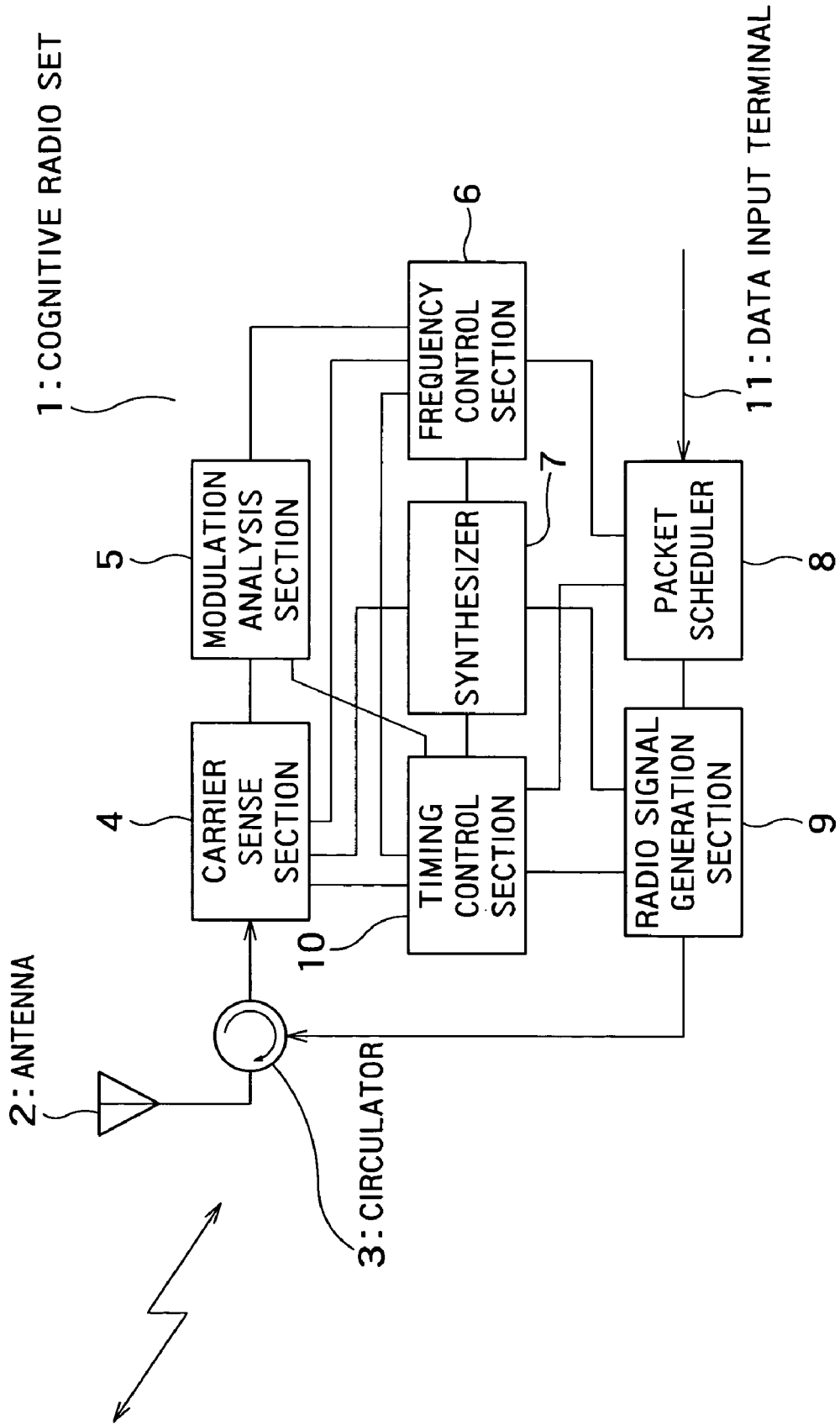
FIG. 1 is a block diagram of a cognitive radio set according to an embodiment of the present invention.
Figure 2:
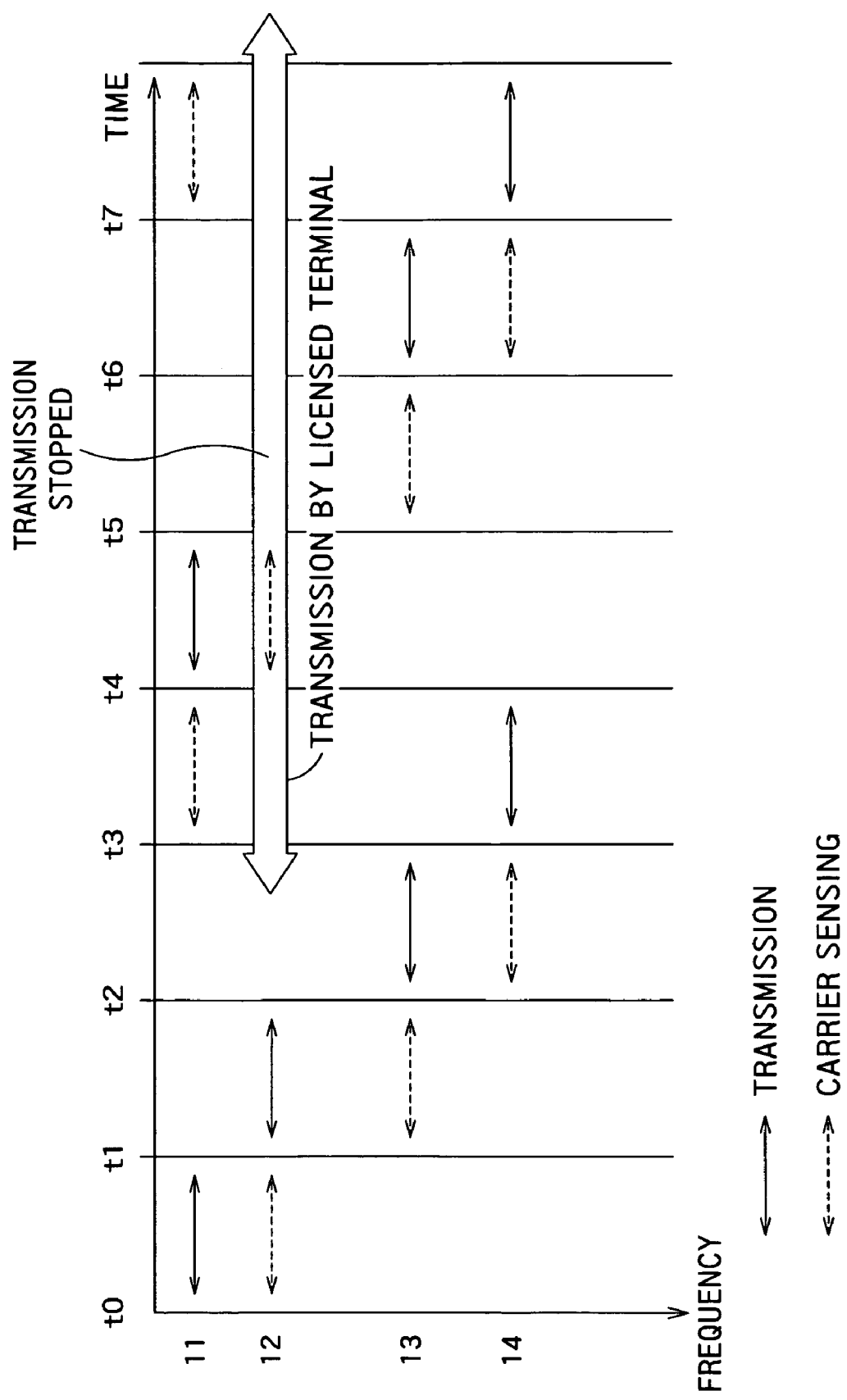
FIG. 2 illustrates an example of operation of the cognitive radio set of the embodiment of the present invention.
Figure 3:
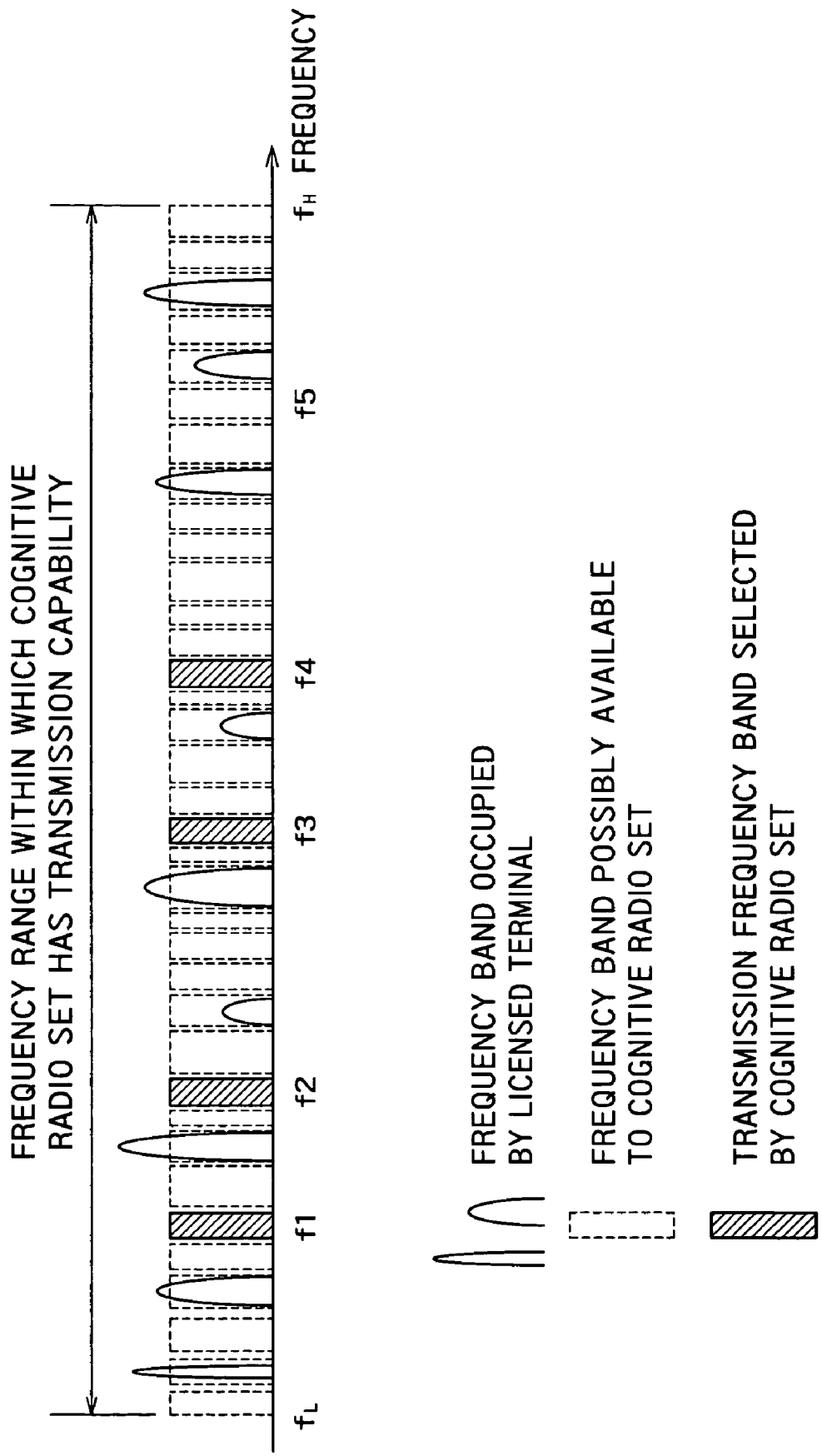
FIG. 3 illustrates an example of frequency band division of the embodiment of the present invention.
Figure 4:
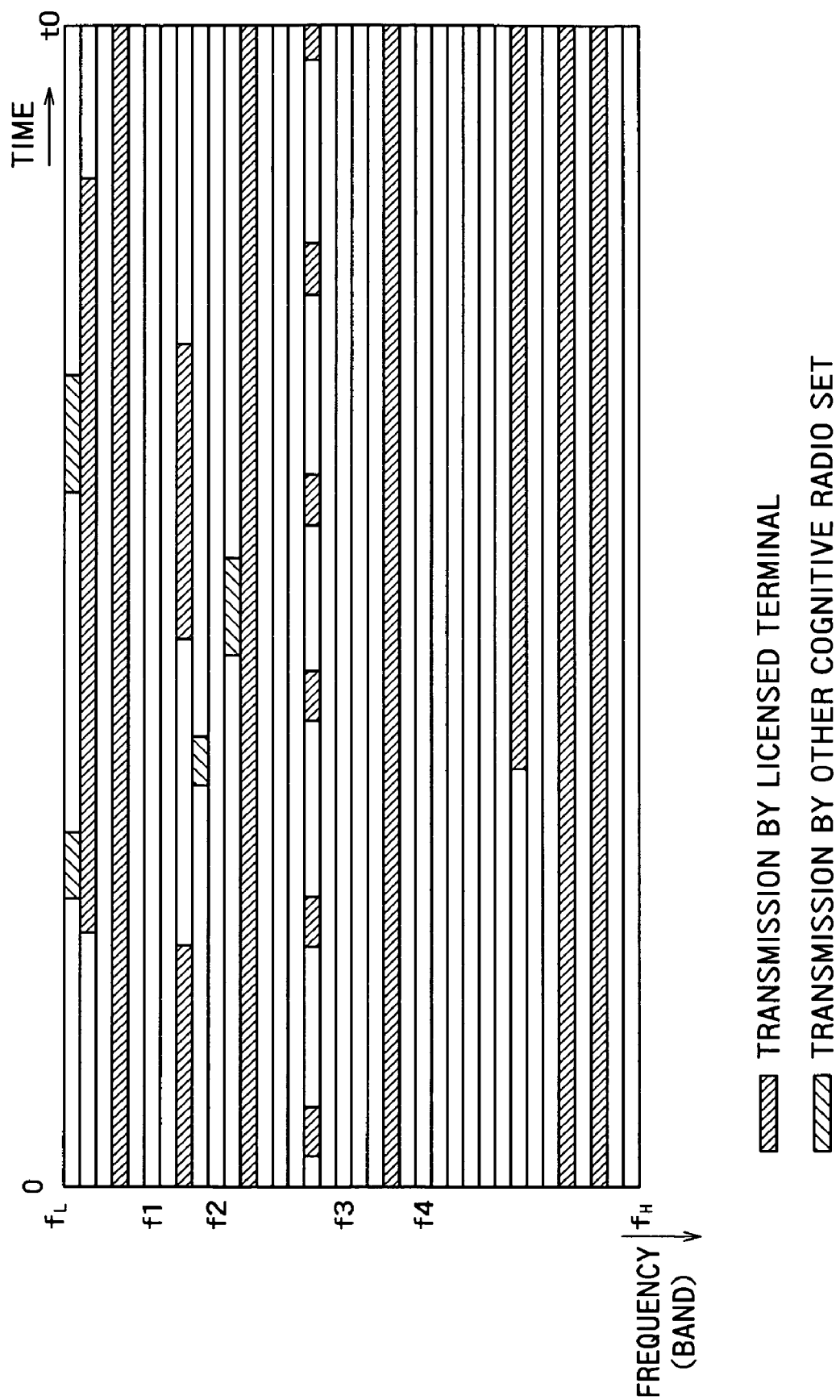
FIG. 4 illustrates an example of the result of channel scanning of the embodiment of the present invention.

FIG. 2 illustrates the operation of a cognitive radio set of the embodiment of the invention after starting data transmission. FIG. 3 and FIG. 4 illustrate the operation by the cognitive radio set according to the embodiment of the invention of selecting a transmission frequency band before starting data transmission. FIG. 3 schematically shows a frequency spectrum and frequency band and FIG. 4 illustrates the status of use of each frequency band detected through channel scanning. FIG. 1 illustrates an outline of the configuration of the cognitive radio set according to the embodiment of the invention.

FIG. 1 shows only parts related to the embodiment of the invention and omits unrelated parts. For example, because the cognitive radio set related to the embodiment of the invention is a radio set to carry out a communication, it needs to have a configuration to receive data in addition to a data transmission section, but FIG. 1 does not show such a configuration.

The operation of the cognitive radio set according to the embodiment of the invention will be explained. The cognitive radio set according to the embodiment of the invention includes a carrier sense section 4 and a modulation analysis section 5, for detecting transmission by a licensed terminal in a frequency band.

The carrier sense section 4 receives a radio signal which is inputted from an antenna 2, through a circulator 3 which determines the direction of transmission and reception, and detects whether a radio signal has been received in one or a plurality of frequency bands which are targets of carrier sensing. Moreover, the carrier sense section 4 detects a time at which a radio signal is detected.

The modulation analysis section 5 analyzes the radio signal received by the carrier sense section 4 and judges whether this is a signal from the licensed terminal in the frequency band or not. A more specific method of realizing the modulation analysis section will be described later.

A characteristic operation of the cognitive radio set according to the embodiment of the invention is a step of determining a frequency band to be used for transmission and a method for data transmission using the frequency band. Hereinafter, the step of determining a frequency band to be used for transmission will be explained first.

The cognitive radio set according to the embodiment of the invention uses a plurality of frequency bands during data transmission. As shown in FIG. 3, the cognitive radio set according to the embodiment of the invention has the ability to transmit data over a wide frequency range from $f_L$ to $f_H$. Within this frequency range, frequencies are divided into a plurality of frequency bands which may be used by the cognitive radio set.

There are various ways of division into frequency bands. In the future when the opening up of radio wave to the public advances and the cognitive radio scheme can coexist with the existing radio system, it is anticipated that regulations on cognitive radio will be stipulated. There is a possibility that the way of division of frequency bands may have been defined under such regulations. Alternatively, if the way of frequency division is not determined in regulations, there is a possibility that it may be defined by a specification of a cognitive radio system or may be left to a judgment by the cognitive radio set on the spot.

When frequency division is performed based on a judgment by the cognitive radio set, it is also possible to adopt a method of scanning channels only around a certain potential frequency to be used and deciding a central frequency and bandwidth of the available frequency band instead of dividing the entire frequency range into a plurality of frequency bands.

In FIG. 3, the interior of a frequency range in which cognitive radio sets have transmission capability is divided into a plurality of frequency bands beforehand, and the central frequency and the bandwidth of each frequency band are adjusted to the band of a licensed system. Instead of adjusting to the band of the licensed system, it is possible, for example, to mechanically divide by the same width, but in the example of FIG. 3, the bandwidth is adjusted to the frequency band of the licensed system to facilitate subsequent modulation analysis processing.

When cognitive radio is widely used, the probability that it may be used for a wideband communication is believed to be high. In such a case, if frequency bands of licensed systems have a narrow band, a frequency band which puts together a plurality of bands of licensed systems may be considered as one frequency band to be used in cognitive radio. Furthermore, it is also possible to put together some or all of a plurality of channels of an identical licensed system using frequency division multiplexing or put together frequency bands of different licensed systems of adjacent frequencies. If a frequency band of the cognitive radio is divided such that any one of channels of licensed systems does not overlap a plurality of frequency bands used by cognitive radio, a subsequent modulation analysis becomes easier.

The cognitive radio set according to an embodiment of the present invention performs channel scanning using a carrier sense function and a modulation analysis function before starting data transmission and determines a plurality of frequency bands to be used for the transmission first. More specifically, carrier sensing is performed with times and periods defined for the respective channel. When some radio signal is received as a result of the carrier sensing, this radio signal is sent to the modulation analysis section and it is judged whether this radio signal is transmitted from a licensed terminal or not. Then, the frequency band, the transmission of which has been confirmed as from a licensed terminal, is removed from among the potential bands to be used by the cognitive terminal for transmission.

FIG. 4 is an example of the result of channel scanning. The horizontal axis shows time. Each frequency band is scanned for a period of t0. The vertical axis displays one frequency band in FIG. 3 as one line. In FIG. 4, a time judged to be a period during which transmission is performed from a licensed terminal in each frequency band is displayed with distinguishing from a time judged to be a period during which transmission is performed from a radio terminal other than the licensed terminal (other cognitive radio set).

In FIG. 4, a total of 36 frequency bands are channel-scanned. Such scanning may be performed sequentially one frequency band at a time on a time-series basis, for example, but when frequency bands are scanned one by one on a time-series basis, the statuses of use of frequency bands may vary during scanning. Therefore, it is desirable to adopt any one of the following methods.

For example, according to one method, the frequency band to be scanned is switched in a very short period, the entire frequency band is scanned, then the frequency bands for which transmission by the licensed terminals has been confirmed are excluded, and then each remaining frequency band is rescanned in detail.

Furthermore, according to another method, a frequency band is scanned in an appropriate order and scanning is stopped when a desired number of frequency bands have been successfully selected. Scanning can be performed in ascending order of frequencies or descending order of frequencies, but as will be described later, in the embodiment of the present invention, there is a desirable combination of a plurality of frequency bands, and therefore it is possible to scan only the vicinities of frequencies in accordance with the combination and scanning may be stopped when a necessity number of transmission frequency bands have been successfully selected.

Furthermore, a bandwidth for which the carrier sense section according to the embodiment of the invention can perform carrier sensing simultaneously need not always correspond to one frequency band. In order to increase the speed of carrier sensing, or considering that, in many cases, the configuration of the data reception section is temporally diverted to the carrier sense section, there may be a case where the cognitive radio set has quite a wide maximum reception bandwidth to support wideband data transmission/reception. In such a case, it is possible to collectively channel-scan a plurality of frequency bands which are close to each other. For example, when the cognitive radio set has a carrier sense bandwidth of approximately ⅕ of the entire frequency range indicated in FIG. 3, it is possible to obtain a result equivalent to that in FIG. 4 through channel scanning approximately five times.

As for transmission frequency bands according to the embodiment of the invention, a plurality of neighboring frequency bands instead of each one of the frequency bands in FIG. 3 may be collectively considered as one transmission frequency band. In such a case, when the aforementioned plurality of adjacent licensed system channels are collectively considered as one frequency band, a plurality of licensed system channels are examined during carrier sensing. Even in such a case, a basic operation does not change. That is, if it is confirmed that the frequency band with which the licensed terminal is transmitting during channel scanning is not selected or if it is confirmed that a licensed terminal is transmitting during carrier sensing after the cognitive radio set starts data transmission, transmission in the frequency band is likewise stopped immediately.

Therefore, for simplicity of explanation, the following explanation will presuppose that during frequency hopping, transmission will be carried out in one frequency band in FIG. 3 at one time.

In the embodiment of the invention, a plurality of transmission frequency bands are selected from such a channel scanning result. The first criterion of selection is that no transmission by the licensed terminal in the frequency band has been confirmed during the channel scanning period.

At this time, an upper limit to the data transmission time of the licensed terminal is determined beforehand and a frequency band in which the data transmission time from the licensed terminal during channel scanning falls below the upper limit may be selected, but to make interference to the data transmission of the licensed terminal as small as possible, it is desirable to exclude the frequency band in which data transmission from the licensed terminal is detected through channel scanning from among the potential bands to be selected.

That is, in FIG. 4, it is preferable to exclude frequency bands from among the potential bands not only when, for example, transmission is confirmed in all periods of channel scanning on the licensed terminal or transmission is performed periodically or transmission is started in a period of channel scanning, but also when transmission is finished during channel scanning. This is because, there is a possibility that the transmission period of the licensed terminal may be longer than the channel scanning period or burst transmission may be carried out intermittently. In this way, excluding frequency bands used even slightly by the licensed terminal from among potential bands makes it possible to reduce the probability that transmission by the licensed terminal may be interfered.

Next, for a frequency band for which transmission from any licensed terminal is not confirmed and yet transmission from another radio set, in most cases, another cognitive radio set is confirmed, the transmission time is confirmed and whether a blank period of the transmission lasts longer than a predetermined period is confirmed. For example, in the case of the frequency band at the top of FIG. 4, transmission by another cognitive radio set is confirmed twice for a channel scanning period. If no blank time exceeding the predetermined period is found during these transmissions or before and after these transmissions, this frequency band is excluded from among the potential bands. Though it depends on a predetermined reference period of the blank period, the same applies to a frequency band for which transmission by another cognitive radio set is confirmed only once during channel scanning.

There are various ways of determining this reference period. Some examples are shown below. In the embodiment of the invention, carrier sensing and modulation analysis are performed before data transmission in each frequency band when a cognitive terminal is carrying out data transmission. Performing a modulation analysis on whether some radio signal detected through carrier sensing is from a licensed terminal or not takes a certain time or more. The necessary time varies depending on the nature of the radio signal of the licensed system, for example, characteristics such as bandwidth, modulation scheme, bit rate, spectrum. Therefore, the above described reference time at least needs to exceed the time necessary for such a modulation analysis.

In the embodiment of the invention, the cognitive radio set performs data transmission intermittently in one frequency band including frequency hopping, and thereby reduces the probability that when a licensed terminal suddenly starts transmission in that frequency band, transmission by the licensed terminal may overlap transmission by the cognitive radio set and interference may be produced. When a cognitive radio set newly performs data transmission in the frequency band in which another cognitive radio set is already performing transmission, the period of the data transmission at the frequency band may increase and when the licensed terminal starts transmission, the probability of producing interference may exceed an allowable range. Therefore, a frequency band in which a certain level of blank period remains is selected even when both transmission of another cognitive terminal and the own transmission exist in the same frequency band.

From such a standpoint, a reference period much longer than the time necessary for a modulation analysis is set in practice so that even when the own transmission is added to the frequency band, the probability of causing interference with the licensed terminal does not exceed an allowable range.

Based on the channel scanning result, a necessary number of transmission frequency bands are selected. At this time, when a number of selectable transmission frequency bands in all frequency bands exceed or are expected to exceed the necessary number, it is preferable to select the necessary number of transmission frequency bands using an adequate method. For example, each frequency band may be assigned a priority order and selected according to the priority order.

With regard to the priority order, in order to disperse transmission by a cognitive radio set, for example, frequency bands in which there is no transmission by other cognitive radio sets may be selected preferentially, or on the contrary, places where transmissions by other cognitive radio sets are already in progress are given priority so as to concentrate transmission by the cognitive radio set as much as possible so that even if interference with a licensed system by a cognitive radio set occurs, the interference has a limited effect on only some licensed systems and so on.

When such a process is further carried forward, as will be described later, the embodiment of the invention may take the form of defining a temporal utilization rate for each frequency band that can be used by the cognitive radio set and transmission is performed by the cognitive radio set so that the use of each frequency band falls within the temporal utilization rate. In such a case, a frequency band in which adding the own transmission makes it exceeds the specified utilization rate is excluded from among the potential bands. The utilization rate after the own transmission is added is calculated and for a frequency band for which the calculated utilization rate does not exceed the specified utilization rate, frequency bands may be selected in ascending order of ratios relative to the specified utilization rate.

There are various methods of determining the specified utilization rate, but it is basically dependent on the magnitude of interference tolerance of the licensed terminal in the frequency band. Therefore, even when the form of "utilization rate" is not taken, it is possible to preferentially select a frequency band of the licensed system having strong interference tolerance on a assumption that the cognitive radio set is aware of the magnitude of the interference tolerance of the licensed system in each frequency band in the form of a database.

Another method may be to select a frequency band which is convenient for a cognitive radio set as will be described later or carry out channel scanning starting with such a frequency and finish scanning when a required number is reached.

A further method may be to carry out channel scanning in descending order of frequency or in ascending order of frequency or in random order and finish channel scanning when a required number is reached.

There are various ways of determining the necessary number of a plurality of transmission frequency bands. In frequency hopping, transmission is performed by switching between frequency bands on a time-series basis. In many cases, a hopping sequence is used periodically, but in the embodiment of the invention, the whole time of the period need not be completely filled with transmissions (including switching guard times).

One of important objects of the embodiment of the invention is to reduce the probability that a cognitive radio set may cause interference with a licensed terminal and from such a standpoint, the time during which transmission is continuously carried out in one frequency band of frequency hopping or the utilization rate which will be described later is restricted. Therefore, when transmission by the cognitive radio set is set to each transmission frequency band based on a continuous transmission time or a utilization rate which is determined in consideration of the licensed system for each frequency band, the necessary number of transmission frequency bands is determined by the number required to satisfy a transmission bit rate required by the cognitive radio set. When the bit rate required by the cognitive radio set cannot be met through one sequence of frequency hopping, it is possible to prepare a plurality of such sequences of frequency hopping and select the number of transmission frequency bands necessary for the respective sequences on an assumption that the cognitive radio set has the ability to transmit two or more hopping sequences simultaneously.

Note that this embodiment of the invention presupposes frequency hopping, but there is another form of carrying out intermittent data transmission independently in each transmission frequency band without using frequency hopping, which will be described later. The number of necessary transmission frequency bands in such a case may also be likewise set to a number necessary for a bit rate required by the cognitive radio set by adding up the communication capacities of the frequency bands determined by a continuous transmission time or utilization rate in each frequency band determined in consideration of the licensed system side. In this case, unlike the case of frequency hopping, the number of transmission frequency bands that may be used at the same time may be quite large. Though it depends on the configuration of the transmission section of the cognitive radio set, there will be no particular problem if transmissions in a plurality of transmission frequency bands can be performed by single wideband transmission section. However, when transmission in one transmission frequency band is performed by single transmission section and transmissions in a plurality of transmission frequency bands are performed by a plurality of different transmission sections, there is a case where the number of transmission frequency bands is determined by the number of transmission sections, since the number of transmission sections provided for the cognitive radio set is smaller than the necessary number determined based on the bit rate.

Once a necessary number of necessary transmission frequency bands are selected in this way, the cognitive radio set according to the embodiment of the invention shown in FIG. 1 to FIG. 4 carries out transmission using frequency hopping. FIG. 2 shows how such frequency hopping is realized.

In FIG. 2, transmissions are scheduled by forming a hopping sequence so as to switch between four transmission frequency bands f1 to f4 in this order. While transmissions are being carried out in their respective transmission frequency bands, carrier sensing and modulation analysis are performed on a transmission frequency band which comes next in the chronological order.

For example, in FIG. 2, transmission is performed in frequency band f1 from time t0 to t1, and at the same time carrier sensing and modulation analysis of frequency band f2 are carried out from time t0 to t1. If there is no problem in the result of carrier sensing carried out in the previous time, transmission is carried out in frequency band f2 on schedule from next t1 to t2. From time t1 to t2, carrier sensing and modulation analysis are carried out on f3, which is the next transmission frequency band. The operation is continued in this way and when transmission is being carried out in transmission frequency band f4, carrier sensing and modulation analysis are carried out on f1 which is the next transmission frequency band returning to the start point of the cycle.

In the above described explanation, carrier sensing and modulation analysis have been described as being carried out simultaneously, but as described above, the embodiment of the invention carries out carrier sensing first and if no radio signal is detected as a result, no modulation analysis is carried out. When the carrier sensing result shows that some radio signal is detected in a frequency band in which the carrier sensing is performed, the radio signal is pass to the modulation analysis section, subjected to a modulation analysis and it is judged whether the detected radio signal is from the licensed terminal in the transmission frequency band or not.

In FIG. 2, in transmission frequency band f2, the licensed terminal in the frequency band starts transmission between t2 and t3. After data transmission is started, the cognitive radio set according to the embodiment of the invention carries out carrier sensing in one frequency band only immediately before carrying out transmission in the frequency band, and therefore even when the licensed terminal starts transmission between t2 and t3, the cognitive radio set in FIG. 2 cannot immediately detect that the licensed terminal has started transmission. However, the embodiment of the invention ensures that transmission by the cognitive radio set in each frequency band (regardless of whether it is frequency hopping or not) is performed intermittently, and therefore even when the licensed terminal starts transmission, if such transmission does not overlap an intermittent transmission time, no interference is caused.

It is between time t4 and t5 that the cognitive radio set carries out next carrier sensing on frequency band f2. When the cognitive radio set carries out carrier sensing in f2 for this period, some radio signal is detected, and therefore this radio signal is handed over to the modulation analysis section and subjected to modulation analysis. As a result, it turns out that the radio signal belongs to the licensed terminal in the frequency band of f2. Then, the cognitive radio set cancels scheduling of the next transmission in f2 and transmits nothing. However, carrier sensing in transmission frequency f3 in the next time is carried out on schedule.

First, in this way, transmission by the cognitive radio set in each frequency band is performed intermittently to thereby reduce the probability of causing interference with the licensed terminal. Furthermore, carrier sensing and modulation analysis are carried out immediately before transmission in each frequency band and if the licensed terminal starts transmission before that, the transmission is detected and transmission by the cognitive radio set in the next time is stopped. As a result, it is possible to significantly reduce the probability of causing interference with the licensed terminal.

Furthermore, since the cognitive radio set carries out data transmission using a plurality of transmission frequency bands, even if transmission of the licensed terminal is started in one frequency band and the cognitive radio set stops the transmission in that frequency band, transmissions in other transmission frequency bands can be continued. Therefore, with regard to the continuity of communication by the cognitive radio set, only minor communication capacity drops may occur temporarily, but no significant problem occurs. Furthermore, such intermittent transmission is carried out in the form of frequency hopping and it is possible to thereby effectively use blank times between intermittent transmissions, use the transmission section of the cognitive radio set on a time-series basis and alleviate the hardware configuration.

How this operates in the configuration in FIG. 1 will be explained briefly below.

A frequency control section 6 grasps the configuration of frequency bands as shown in FIG. 3 and scans necessary frequency bands according to this configuration in the stage of channel scanning first (as described above).

The frequency control section 6 instructs a synthesizer 7 on a frequency band to be scanned so as to make the synthesizer 7 output a local signal necessary to scan the frequency band. This local signal is inputted to the carrier sense section 4, which carries out carrier sensing on the necessary frequency band on the basis of the local frequency.

A timing control section 10 instructs the carrier sense section 4 on the start, period and end of carrier sensing in the frequency band. More specifically, the timing control section 10 instructs the synthesizer 7 on the start/end timing of output of the local signal in the frequency and also instructs the carrier sense section 4 and modulation analysis section 5 on the same.

The carrier sense section 4 is detecting energy or power to see whether the inputted signal includes a radio signal or not and when a radio signal is detected, the carrier sense section 4 sends this signal to the modulation analysis section 5. Furthermore, the carrier sense section 4 stores information of the period in which the radio signal is detected and sends it to the frequency control section 6.

The modulation analysis section 5 receives an instruction from the frequency control section 6 on the frequency band currently being subjected to carrier sensing, fetches the modulation scheme corresponding to the licensed terminal in the frequency band from an internal memory or the like and when it receives an input from the carrier sense section 4, the modulation analysis section 5 analyzes the modulation scheme and verifies whether that modulation scheme matches the modulation scheme of the licensed terminal or not. When the two schemes do not match, the modulation analysis section 5 notifies the frequency control section 6 that a transmission from a terminal other than the licensed terminal has been received and when the two schemes match, the modulation analysis section 5 notifies the frequency control section 6 that a transmission has been received from the licensed terminal. The frequency control section 6 stores this and instructs channel scanning on the next frequency band if necessary. When the necessary channel scanning is completed as described above, the frequency control section 6 selects a plurality of transmission frequency bands. The frequency control section 6 forms a hopping sequence based on this and notifies the hopping sequence to other blocks. Upon receiving this hopping sequence, the timing control section 10 notifies appropriate switching timing of the frequency to the synthesizer 7. Upon receiving the timing, the synthesizer 7 outputs a local signal for carrier sensing necessary for that time and a local signal for data transmission to the carrier sense section 4 and a radio signal generation section 9, respectively. In starting data transmission, data to be transmitted is inputted from the data input terminal 11 to a packet scheduler 8.

Since the packet scheduler 8 is aware of the amount of data that can be transmitted through one data transmission in each transmission frequency band based on the notification received from the frequency control section 6, the packet scheduler 8 divides the data inputted from the data input terminal into appropriate lengths based on an instruction from the timing control section 10, that is, frequency band in which the next transmission is carried out, stores the divided data in a buffer if necessary and outputs the data to the radio signal generation section 9 based on the instruction on the output timing from the timing control section 10.

The radio signal generation section 9 converts the data to the format of a radio signal based on the local signal inputted from the synthesizer 7 and sends the radio signal to the antenna 2 through the circulator 3. The radio signal sent to the antenna 2 is emitted in the form of radio wave.

On the other hand, the carrier sense section 4 carries out carrier sensing on the necessary frequency band based on the local signal sent from the synthesizer 7 and when a radio signal is detected, it sends the radio signal to the modulation analysis section 5. The modulation analysis section 5 analyzes the modulation scheme of the radio signal received, judges whether this radio signal is from the licensed terminal of the frequency band and notifies the result to the frequency control section 6. If no transmission from the licensed terminal is notified, data is transmitted on schedule. On the other hand, when a transmission from the licensed terminal is notified, the frequency control section 6 instructs the timing control section 10 to stop the next transmission in the frequency band.

Upon receiving this instruction, first, the timing control section 10 notifies the instruction to the synthesizer 7, packet scheduler 8 and radio signal generation section 9 and causes the synthesizer 7 to stop the output of a local signal for transmission in the frequency band. Next, the timing control section 10 instructs the packet scheduler 8 to discard the data stored in the buffer for the next transmission or temporarily save the data in another memory area. Furthermore, the timing control section 10 notifies the radio signal generation section 9 that there will be no input from the synthesizer 7 or packet scheduler 8 because the next transmission is stopped and in certain instances prevents any signal from being outputted from the radio signal generation section 9 for the period.

In FIG. 2, various types of operation are possible after the transmission in f2 is stopped. For example, as the simplest method, the cognitive radio set in FIG. 2 continues to repeat transmissions in f1, f3, f4 except f2 until the communication is completed. Such a method is suitable for a case of burst-like data transmission such as file transfer in which a certain level of drop in the bit rate does not matter, the amount of data transmitted is small and the transmission can be completed in a relatively short period. At this time, if it is decided that transmission will be continued to the end without transmission in f2, carrier sensing on f2 need not be carried out further in the period of transmission in f1.

Another method is to continue carrier sensing on f2 in the period of transmission in f1, confirm the end of the transmission by the licensed terminal and restart the transmission in f2 in the case where no transmission is received from the licensed terminal for a while after that. This is suitable for a case where transmission is continued for a long period of time and there is little influence even if a bit rate drops to some extent.

Here, the system waits for a while even after the transmission from the licensed terminal is completed because the other party (destination terminal) of communication of the licensed terminal may start transmission on a time-division basis or the licensed terminal is carrying out periodical transmission and all communications may not have been actually completed yet even if the transmission seems to have ended.

Figure 5:
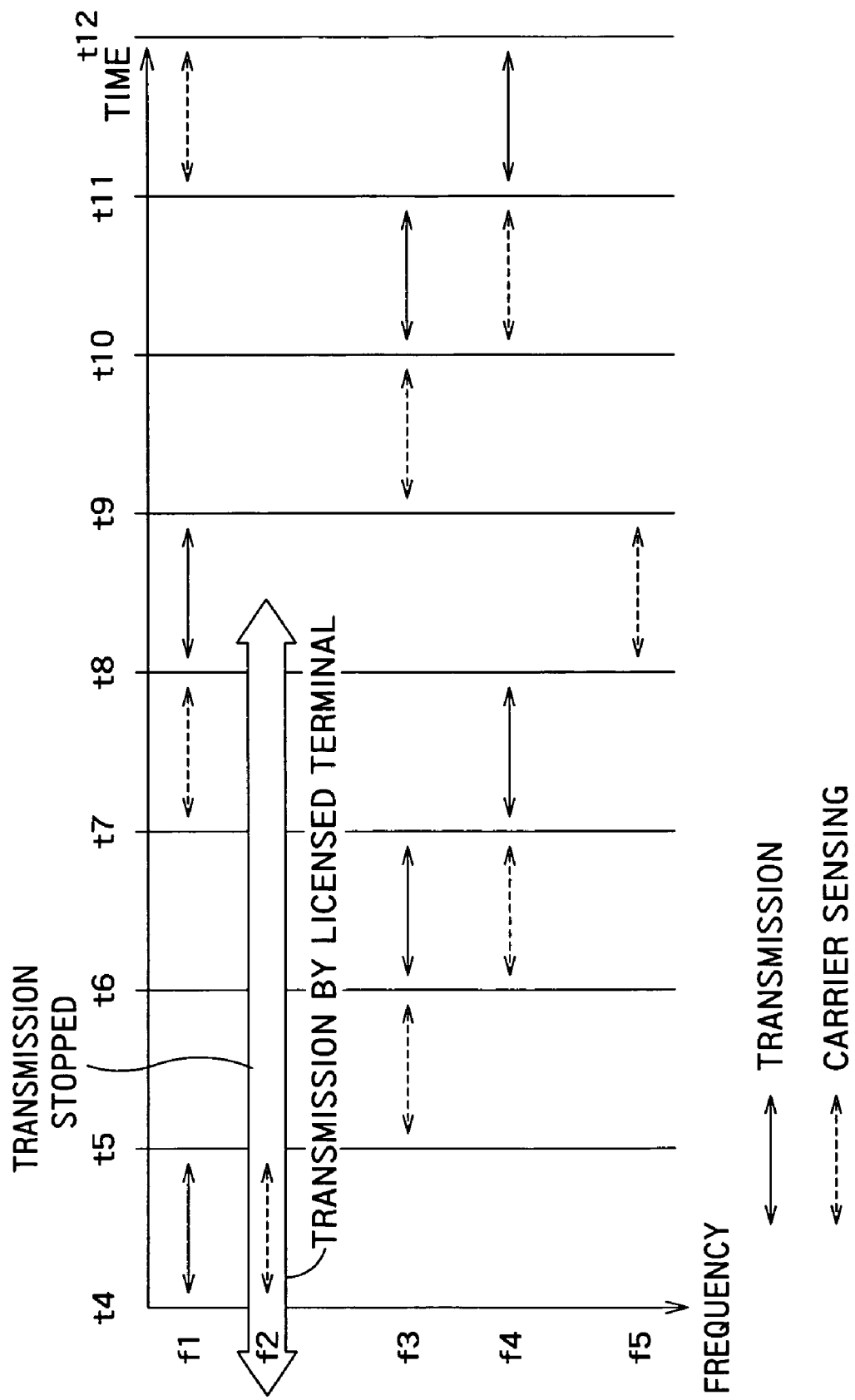
FIG. 5 illustrates an example of operation of the cognitive radio set of the embodiment of the present invention.

Since such a judgment is actually difficult, the time of transmission in f2 is preferably switched to another transmission frequency band. The cognitive radio set selects one or more spare transmission frequency bands such as f5 in FIG. 3 at a time of channel scanning in addition to a plurality of transmission frequency bands which are used first. When transmission in f2 is stopped, then one of spare transmission frequency bands, for example, f5 is subjected to carrier sensing instead of f2 as shown in FIG. 5 for the next time of transmission in f1. In the next time of transmission in f2, no transmission is performed as in the case of the previous time. Such carrier sensing is carried out on f5 several times, and as a result, if no transmission by the licensed terminal in frequency band f5 is confirmed, transmission is carried out in f5 for the next time of transmission in f2.

Here, carrier sensing is carried out over several cycles because unlike the case of channel scanning, not a sufficient time can be taken at one-time carrier sensing and carrier sensing is regarded as have been performed for a sufficient time, totaling several cycles.

The hopping sequence is changed in this way. At this time, if a frequency band having the nature similar to that of the frequency band f2 is selected as a new transmission frequency band, it is possible to reduce influences of the cognitive radio set on transmission quality.

Here, the "similar nature" means similarity in a bandwidth or transmission capacity of data that can be transmitted, or similarity in interference tolerance of the respective licensed terminals and blank period or utilization rate required for transmission by the cognitive radio set, or similarity in condition of usage of other cognitive radio sets or the like. It is preferable to evaluate these parameters with weights assigned thereto and select an appropriate spare transmission frequency band.

Since the bit rate drops for only a short period and can be recovered immediately, such a method is suitable for a case where an isochronous communication such as audio/video transmission is carried out for a long period of time.

Various types of processing are also applicable to the data originally scheduled to be sent in f2 during a time from t5 to t6 in FIG. 2.

The simplest and most effective method is to discard the data and leave a loss of data to a higher layer equal to or higher than MAC (Media Access Control). In the case of a wireless communication, packet losses may frequently occur due to deterioration in a propagation environment, and therefore such problems can be handled using such a method in most cases.

Furthermore, if the processing by the packet scheduler is performed in time, it is also possible to depacketize the packetized data to be originally sent in f2 during the time from t5 to t6 and packetize it again so that it is sent in and after f3. Such a method is available when the processing by the packet scheduler is very fast with respect to the transmission period in one frequency band. Since there is no packet loss, better quality can be secured for the data communication.

Another method is to save the data in another memory area, put it in an appropriate position of the subsequent data string and send the data. In such a case, the data sequence is inverted, and therefore it is necessary to indicate that the data sequence has been changed by using sequence numbers or the like in a physical layer frame of the packet or MAC frame of the packet. It is also possible to determine whether to discard the data or send the data by even changing the sequence depending on the nature of the data (whether or not it is required to send the data even if the sequence is changed or the like) in coordination with the MAC or higher layer.

Furthermore, when stopping data transmission in f2, the cognitive radio set according to the embodiment of the invention preferably notifies it to the cognitive radio set in communication. If only the problem with a data loss was considered, it would not be necessary to notify the stoppage of transmission in f2. However, once transmission in f2 is stopped in the configuration according to the embodiment of the invention, the transmission in f2 may continue to be stopped or may be moved to another frequency band in some cases, and therefore it is necessary to notify the receiving side of the stoppage of transmission in f2 so that the receiving side can collaborate with these operations.

As for the notification method, if relatively slow frequency hopping is performed, it is possible to notify at the end of transmission from t4 to t5, for example, using the end of the physical layer frame, that the next transmission in f2 will be stopped. Realizing this requires the next transmission data packetized by the packet scheduler 8 to be changed, and therefore a very fast operation is required for the frequency control section 6 and packet scheduler 8. However, since the stoppage of transmission can be notified to the communicating terminal beforehand, data can be sent/received smoothly.

As another method, the fact that transmission in f2 has been stopped can be notified in the form of after-the-fact notice during transmission in f3 or f4 following f2. A wireless communication may fail to receive data due to a variation in the propagation environment other than such intentional stoppage of transmission, and therefore it is desirable, if possible, to use both before-the-fact and after-the-fact notices or to notify the after-the-fact notice several times using a plurality of transmission frequency bands.

In such a case, it is necessary to indicate with a frequency band number in the hopping sequence and hopping frame number, or the like so as to identify at which timing and in which frequency band, transmission is stopped. For this purpose, it is desirable to assign a serial number which can be a small number of bits to the hopping frame, which is repetition unit of hopping sequence, and assign a number to each frequency band in the hopping sequence. If the cognitive radio sets have a dedicated control channel or a control channel using the ISM band (Industry Science Medical band) in addition to the frequency band for data communication, notification can be performed through such a control channel.

In the form as shown in FIG. 2, while the cognitive radio set is transmitting data in a certain frequency band, transmission by the licensed terminal in the frequency band may also be started. The embodiment of the invention performs data transmission in each frequency band intermittently, including frequency hopping, and thereby reduces the possibility of interference between data transmission by the cognitive radio set and data transmission by the licensed terminal, but it is not possible to completely exclude such interference.

Therefore, when the continuous transmission time is relatively long in one frequency band, when there is a transmission/reception section for a control channel in addition to data transmission and when the cognitive radio set on the receiving side has the function capable of judging that interference by the licensed terminal is added to a signal to be received, it is desirable to judge the presence/absence of interference by the cognitive radio set on the receiving side, notify it to the cognitive radio set on the transmitting side through the control channel so that the cognitive radio set on the transmitting side can immediately stop transmission in the frequency band. Here, the function of judging interference refers to the function capable of judging that it is not deterioration of the propagation environment or the like, and that the modulation accuracy deteriorates or the error rate increases though the reception power has not dropped.

On the other hand, when the continuous transmission time in one frequency band is relatively short, exchange of data through a control channel cannot be performed in time, or there is no control channel which is different from the transmission frequency band, the radio signal may cause interference with the radio signal which the licensed terminal is transmitting until the transmission in the transmission frequency band is completed. When notification through such an independent control channel is not possible, it is desirable to set the continuous transmission time in one frequency band to a short time to such an extent that even if interference is given to the licensed terminal during that time, no significant influence is given to the communication quality on the licensed terminal.

At the start of communication, first, most wireless systems send a signal with not so large an amount of information such as preamble for synchronization. In general, even if reception of a sync signal fails to a small degree, it does not give a significant effect on the communication. Therefore, the length that does not give large effects on the communication quality of the licensed terminal means a sufficiently short time with respect to the period of such a sync signal.

On the other hand, when after a data transmission is started, a transmission by a terminal other than the licensed terminal is confirmed through carrier sensing and before a transmission period in each frequency band, the following operation can be performed, for example.

If the transmission by the other terminal has been completed within a transmission period in a previous frequency band, that is, during a carrier sensing period, the next transmission is carried out on schedule or otherwise the transmission at that time is stopped. If a similar radio signal is not detected in the next hopping frame, the transmission in the frequency band continues on schedule. If the transmission by the other cognitive terminal is not completed within the carrier sensing period for several cycles, the transmission in the frequency band may be stopped using the same procedure as that when a licensed terminal is confirmed or the transmission may also be avoided by changing the order of the hopping sequence so as to shift the timing from that of transmission by the other cognitive terminal.

When transmissions overlap in the form of interference during data transmission, it is often the case that carrier sensing is not possible and even the cognitive radio set on the receiving side cannot judge whether the signal received overlapped is from the licensed terminal or the other cognitive radio set, either. In this case, since the possibility that the received signal may be from the licensed terminal cannot be denied, the transmission is preferably considered to be from the licensed terminal. Since the cognitive radio set is a radio set that carries out communications during frequency/time intervals of other radio sets, there is a low possibility that transmissions may be performed in such a way that transmissions by other cognitive radio sets overlap. However, due to unevenness of radio wave propagation distance or the like, other cognitive radio sets cannot receive a transmission of a certain cognitive radio set and it is not possible to completely avoid the occurrence of such a problem. The embodiment of the invention has the modulation analysis function to distinguish whether a terminal is a licensed terminal or not unless such a situation occurs, and can thereby identify the other party and determine whether or not to suspend a transmission in the frequency band. Therefore, it is possible to prevent the frequency band from being relinquished to another cognitive radio set which originally has no priority and immediately relinquish the frequency band to a licensed terminal.

In the above described configuration, the time for carrying out channel scanning on one frequency band is basically sufficiently longer than the time for carrying out carrier sensing before transmission in the frequency band during a transmission. This is because the cognitive radio set performs based on an assumption that it does not interfere with the licensed terminal. That is, a sufficient time is taken to carry out channel scanning to confirm the presence/absence of a licensed terminal. Furthermore, by reducing the continuous transmission time and utilization rate in each transmission frequency band in a transmission, the probability that the licensed terminal may be interfered with when it starts a transmission is reduced and the influences of the result of interference on the communication quality of the licensed terminal are reduced, but in frequency hopping, carrier sensing is carried out for only a transmission period of the immediately preceding frequency, and therefore as a result, the carrier sensing period is shortened.

Here, in frequency hopping, carrier sensing is carried out for only the transmission period of the immediately preceding frequency because the advantage of frequency hopping is that it is possible to share the transmission section and carrier sense section by a plurality of transmission frequency bands through time division and thereby reduce its hardware configuration.

Next, a specific method of implementing the modulation analysis section 5 will be described. The specific method of implementing the modulation analysis section 5 is, for example, as follows.

There are several methods which are generally used for a modulation analysis. First, there is a pattern recognition method whereby a received signal is sampled, its frequency/time statistic values are calculated and it is examined whether the values match statistical features of the specific modulation scheme or not. In examining whether or not the features match in pattern recognition method, a method of judging from vector distances of respective statistic values and a method of judging using a learned neural net or the like are known.

In addition, a deterministic method of classifying the received signal based on each statistic value and repeating the classifying until statistic values are eventually classified into a group composed of one modulation scheme, or a method using periodic stationarity by examining self-correlation of frequencies and analyzing their patterns are known. Using either method, a sampled signal is analyzed through digital processing.

For a modulation analysis used in the embodiment of the invention, either method can be used, but there is a feature which is peculiarly required for the embodiment of the invention. The rate of correctness of the modulation analysis results is not 100% and may fail. The error direction and probability should be made uneven. That is, a setting is made such that the probability that a licensed terminal may be erroneously judged as a non-licensed terminal is set to be a value as small as, for example, $10^{-4}$ and, on the other hand, the probability that transmission by a terminal other than a licensed terminal may be erroneously judged as transmission from a licensed terminal may be set to be as large as, for example, 10%. This is possible, for example, by setting a vector range within which a terminal is judged as a licensed terminal to a relatively wider range in a pattern recognition method or by setting a threshold of statistic values when classifying so as to be easily judged for a group in which a licensed terminal exists in a deterministic method. By doing so, it is possible to reduce the possibility of causing interference with a licensed terminal.

MODIFICATION EXAMPLE 1

Next, a more specific embodiment of selecting transmission frequency bands according to utilization rates will be explained.

Figure 6:
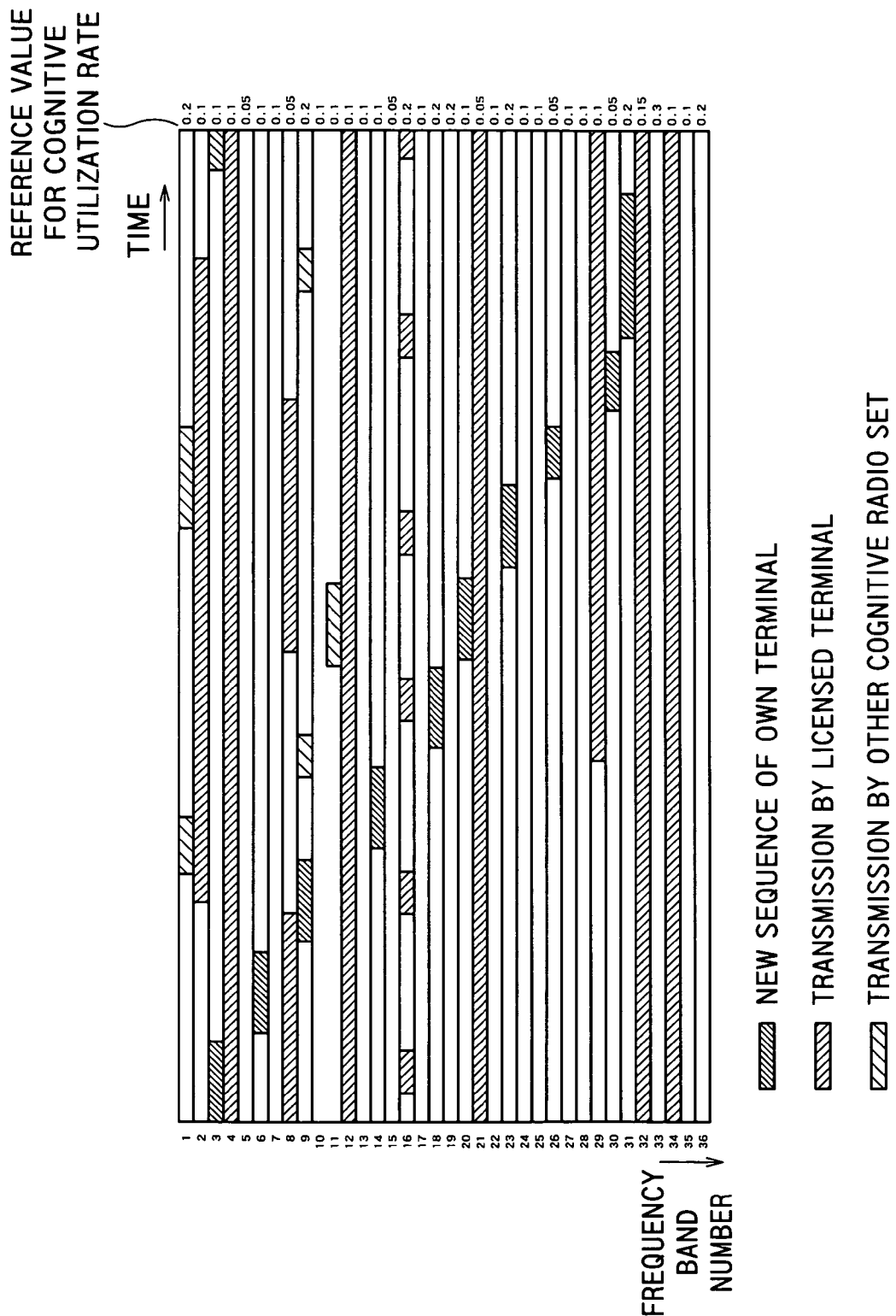
FIG. 6 illustrates an example of a hopping sequence of modification example 1 of the embodiment of the present invention.

FIG. 6 illustrates the operation of selecting a plurality of transmission frequency bands based on utilization rates. The horizontal axis in FIG. 6 shows time and the vertical axis shows numbers assigned to frequency bands. Numbers shown on the right side of the table denote utilization rate reference values which are maximum utilization rates that cognitive radio sets can occupy in the frequency band.

When the cognitive radio set selects a plurality of transmission frequency bands, it carries out channel scanning first just as is the case with FIG. 4. In FIG. 6 as well as FIG. 4, the time judged as a time at which transmission from a licensed terminal is carried out is distinguished from a time at which transmission from a radio terminal other than the licensed terminal is carried out.

As in the case of FIG. 4, the cognitive radio set selects transmission frequency bands based on such channel scanning results. In this case, with reference to a utilization rate reference value of a candidate frequency band, it selects a frequency band having a utilization rate which falls within the range of the utilization rate reference value, even when the own radio set transmission is added in that frequency band.

Here, calculations of the utilization rate do not include the transmission by the licensed terminal in that frequency band. This is because the embodiment of the invention basically performs no transmission in a frequency band in which the licensed terminal is carrying out a transmission or the licensed terminal is estimated to be quite likely to perform transmission soon. Therefore, as the utilization rate, a utilization rate of transmission by a radio set other than the licensed terminal, that is, a utilization rate of transmissions by cognitive radio sets are measured or calculated.

For measurement of the utilization rate, channel scanning is carried out for a sufficient time in the respective frequency bands and a ratio of the total period during which transmission by the cognitive radio set is received is calculated. When the cognitive radio set selects a transmission frequency band, it calculates a utilization rate in a state in which the own transmission is added and if this utilization rate exceeds the utilization rate reference value in the frequency band, the frequency band is not selected or the own continuous transmission time in the frequency band is set to a short time and selected so as to fall within the range of the utilization rate reference value.

In FIG. 6, frequency band numbers 26 and 30 have utilization rate reference values as small as 0.05 and setting a continuous transmission time similar to that in other frequency bands will cause the utilization rate to exceed the reference value, and therefore a short continuous transmission time is selected. To complement the transmission times reduced in these frequency bands, the continuous transmission time of frequency band number 31 whose reference value is as large as 0.2 is set to a long time.

In FIG. 6, the reference value is a maximum of 0.3, and the average is as small as 0.1 to 0.2, and therefore as shown in FIG. 2, it is not possible to form such a hopping sequence that switching is made among 4 frequency bands with substantially no gaps to form one cycle. As described above, whether or not to fill all the time area is determined by a requirement of bit rates, and therefore not all times need to be filled, but if an attempt is made to form a hopping sequence so as to fall within a reference value shown in FIG. 6, and so that substantially the entire time area except guard intervals is filled, it is necessary to use more frequency bands as shown in FIG. 6. In FIG. 6, 10 frequency bands are selected to form a hopping sequence.

The utilization rate reference value is defined with respect to, for example, the strength of interference tolerance of the licensed system in the frequency band and frequency of usage by the licensed system. When transmission by the licensed terminal overlaps transmission by the cognitive radio set, a large reference value is defined in the case where the influence is small even if the overlapping time is long, while a small reference value is defined when the influence is large if the overlapping time is not short. Furthermore, a relatively large reference value is defined when the frequency of usage of the licensed terminal is small, while a relatively small reference value is defined when the frequency of usage is large. These two parameters are combined with weights assigned thereto and one reference value is determined eventually. In this way, a reference value may be determined by each cognitive radio set or wireless system to which the cognitive radio set belongs based on information provided beforehand for each cognitive radio set or information on interference tolerance obtained from an outside database and frequency of usage, but the reference value may also be defined by standards and regulations for cognitive radio sets in the future.

In FIG. 6, most of the transmission frequency bands selected by the cognitive radio set according to the embodiment of the invention are frequency bands not used by other cognitive radio sets, but a frequency band (frequency band number 9) including transmissions carried out by other cognitive radio sets is also selected. At this time, the cognitive radio set naturally selects a frequency band after confirming that the utilizations of the transmissions by the other cognitive radio set and own transmission combined is equal to or smaller than the utilization rate reference value in the frequency band.

Here, if the transmission by the other cognitive radio set is carried out not as a single packet transmission but as periodically transmissions, it is necessary to set own transmission timing, that is, the position during a hopping sequence so that the own transmission will not overlap that transmission in the future, either. When the period of the hopping sequence is determined to a certain value as a standard or the like, it is only necessary to shift the timing. Otherwise, it is preferable to confirm the transmission period of the other cognitive terminal in the transmission frequency band during channel scanning, carry out transmission in a period matching the confirmed period in the frequency band (specific method will be described later) or shift the timing to an extent that they do not overlap until the own transmission is completed even if the periods do not completely match.

In this way, the embodiment of the invention ensures that transmission by the cognitive radio set falls to or below the reference value of the utilization rate not only for the own radio set but also for other cognitive radio sets included. For this reason, the probability that the licensed terminal may be affected by interference in the frequency band falls to below the reference value at the beginning of the licensed terminal transmission. Since the reference value is determined based on the interference tolerance of the licensed terminal in the frequency band, setting transmission by the cognitive terminal based on the reference value in this way makes it possible to keep the influences on the licensed terminal small.

As the method of selecting transmission frequency bands based on the utilization rates, it is also possible to select transmission frequency bands without using any reference value in particular. For example, when channel scanning is carried out, the utilization rate at that time is measured, it is possible to select transmission frequency bands so as to minimize the variation of the utilization rate for each frequency band when the own transmission is added, that is, make transmission by the cognitive radio set disperse over as many frequency bands as possible. Such a method is suitable for a case where no utilization rate reference value is defined by a regulation or standard. Or when grades of interference tolerance are given to each frequency band instead of the utilization rate reference value, the own transmission may be dispersed so that a relatively large utilization rate is set for a frequency band with high interference tolerance and a relatively low utilization rate is set for a frequency band with low interference tolerance.

The cognitive radio set according to the embodiment of the invention carries out measurement of the utilization rate in each transmission frequency band in a channel scanning step and carries out no measurement after a data transmission is started. However, there are a plurality of standards for cognitive radio sets and there may be a case where a cognitive radio set which selects a transmission frequency band based on a utilization rate as in the case of the cognitive radio set according to the embodiment of the invention is mixed with such a cognitive radio set that uses a frequency band if it is unoccupied without considering any utilization rate. In such a case, a cognitive radio set of another standard which starts a transmission beyond an upper limit of the utilization rate may appear in the transmission frequency band selected and used in consideration of the utilization rate by the cognitive radio set according to the embodiment of the invention.

In preparation for such a situation, the cognitive radio set according to the embodiment of the invention may also be adapted, for example, so as to stop transmission periodically and carry out channel scanning, or provide another system of carrier sensing/modulation analysis section and carry out channel scanning on each transmission frequency band while carrying out transmission. As a result, when the utilization rate exceeds the own reference value, the transmission in the frequency band may be stopped using a procedure similar to that used when a licensed terminal is detected, or the frequency band may be moved to another spare transmission frequency band.

As described above, in order to satisfy the utilization rate reference value, that is, to keep the influences on the licensed terminal to a certain value or below, the continuous transmission time in each transmission frequency band of the cognitive radio set according to the embodiment of the invention may differ from one transmission frequency band to another. This is because the cognitive radio set according to the embodiment of the invention is intended to reduce the influences on the licensed terminal to a minimum in accordance with the interference tolerance of the licensed terminal.

MODIFICATION EXAMPLE 2

The configuration realized through frequency hopping has been explained so far, but if attention is focused on the effectiveness of the cognitive radio set according to the embodiment of the invention, frequency hopping is not always required.

Figure 7:
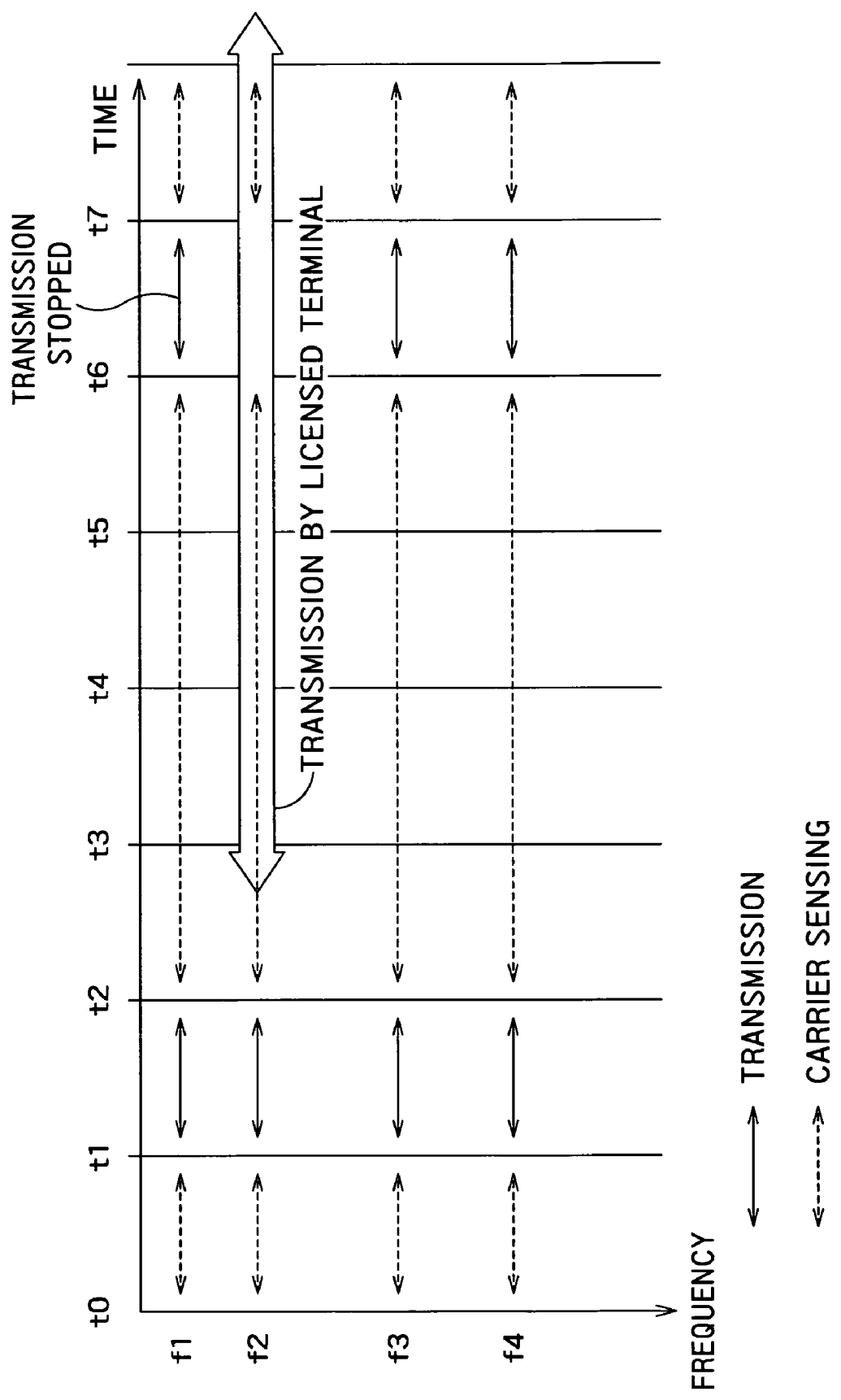
FIG. 7 illustrates an example of operation of modification example 2 of the embodiment of the present invention.

FIG. 7 shows an example where 4 frequency bands are used just as is the case with FIG. 2 and transmission is carried out intermittently in a plurality of frequency bands without using frequency hopping.

In FIG. 7, in time from t1 to t2, all transmissions are carried out simultaneously in all transmission frequency bands and then in a period from t6 to t7 after a certain interval, all transmissions are carried out simultaneously again and such transmissions are repeated. Steps until the step of selecting a transmission frequency band are the same as those explained so far. This method only differs in that transmission frequency bands are not switched on a time-series basis, and produces effects similar to those of frequency hopping in respect of intermittent transmissions in a plurality of frequency bands.

However, this method requires transmissions to be carried out simultaneously or independently in a plurality of transmission frequency bands, which causes the scale of the transmitter/receiver configuration to increase. If the respective transmission frequency bands are transmitted using different transmission systems, a plurality of transmission systems are required and if a transmission section is configured, for example, on the basis of a fast Fourier transform and digital/analog converter so as to cover the whole frequency range, it is necessary to operate such a transmission section at a very high sampling rate. However, the carrier sensing time can be extended by just that much compared to frequency hopping, which makes it possible to realize sufficient carrier sensing and a more accurate modulation analysis.

As shown in FIG. 7, since blank periods of all intermittent transmissions are used for carrier sensing, when a transmission by a licensed terminal is started in any one of transmission frequency bands, this can be immediately detected. However, in the form as shown in FIG. 7, data transmission is carried out intermittently, and therefore this may be unfitted to transmission of isochronous data though it depends on the degree of shortness of the period of data transmission.

Furthermore, the example in FIG. 7 has advantages such as facilitating establishment of synchronization on the receiving side by carrying out periodic transmissions. However, from the standpoint of achieving an aim of reducing interference with a licensed terminal, which is a main object of the present invention, the respective transmission frequency bands need not have definite periods as far as they are intermittent transmissions and it is only necessary to secure a sufficient blank period between transmissions. In an extreme example, there can be such a transmission frequency band that transmission may be carried out only once and completed.

In such a form, the continuous transmission time in each transmission frequency band may differ from one frequency band to another as described so far. Furthermore, the period may also differ from one transmission frequency band to another.

Figure 8:
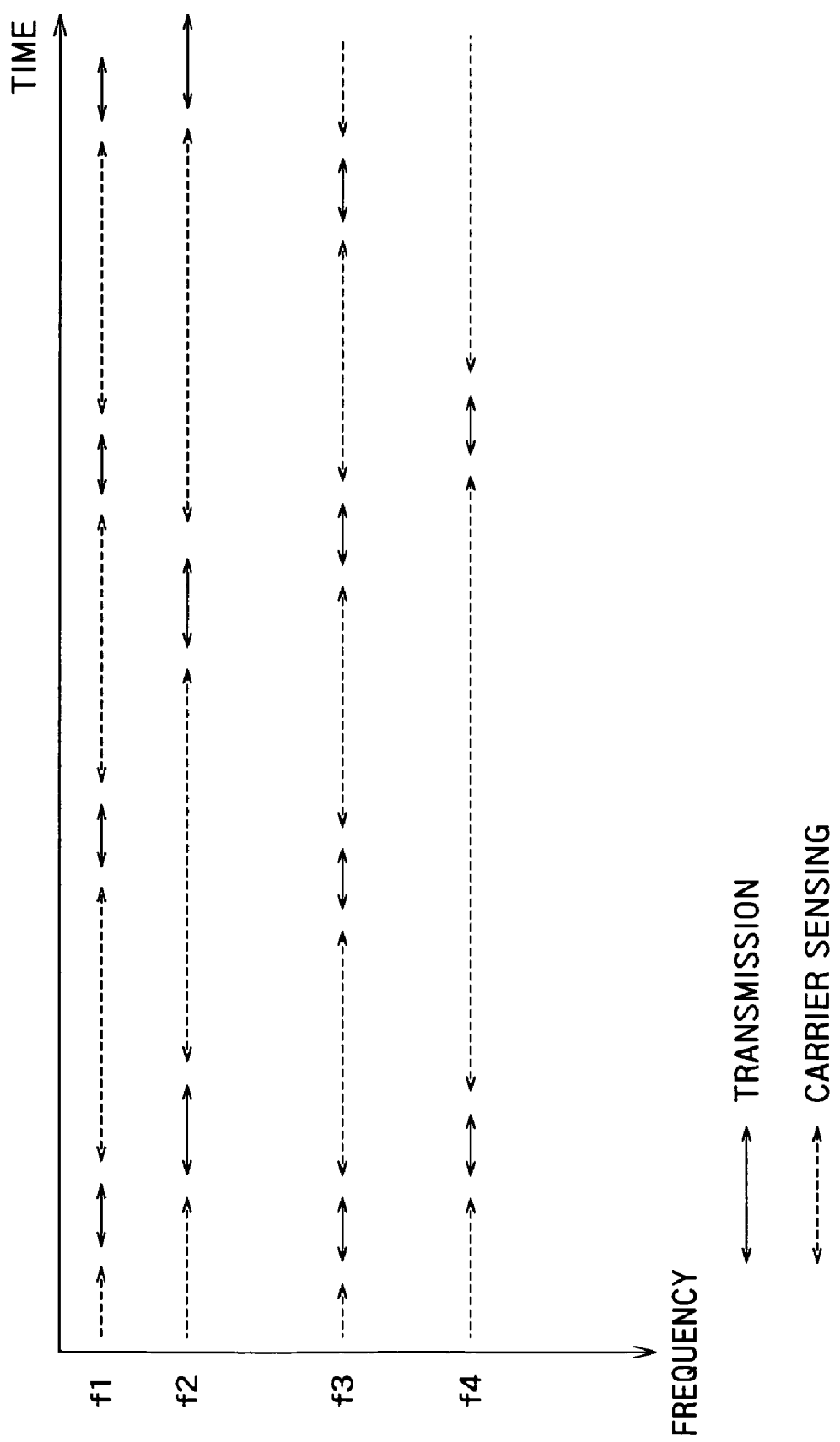
FIG. 8 illustrates an example of operation of modification example 2 of the embodiment of the present invention.

FIG. 8 shows an example where such transmissions are carried out. In FIG. 8 unlike FIG. 7, each transmission frequency band does not carry out simultaneous transmissions. However, it does not carry out transmission by switching between frequency bands on a time-series basis as in the case of frequency hopping either. Transmissions are carried out in transmission frequency bands for periods and at timings which are independent of one another.

In this way, one example of the case where a period of data transmission differs from one transmission frequency band to another is a case where when there is a demand for suppressing the utilization rate to within a reference value and the continuous transmission time cannot be shortened, such a situation is handled by extending the period. Furthermore, another example is a case where a period of data transmission, that is, a blank period is changed, depending on whether the licensed terminal carries out carrier sensing and how long carrier sensing lasts when it is carried out.

When the licensed terminal starts transmission after carrying out carrier sensing, if transmission by the cognitive radio set is received by the licensed terminal, there may be a case, depending on the magnitude and length of transmission by the cognitive radio set, where the licensed terminal recognizes that the channel is in use. That is, this is equivalent to giving interference before the licensed terminal starts transmission. At this time, if, for example, the transmission period in the frequency band of the cognitive radio set is shorter than the carrier sensing time of the licensed terminal, the transmission by the cognitive radio set (located within a range within which the radio wave reaches) is always received by the licensed terminal during carrier sensing, and depending on the magnitude, it is assumed that interference exists. On the other hand, if the transmission period is longer than the carrier sensing time, it is possible to reduce the probability that the licensed terminal may sense transmission by the cognitive radio set.

In the case where a threshold for judging the presence/absence of interference in carrier sensing of the licensed terminal is low, if the licensed terminal judges that interference exists when there is a little amount of transmission by the cognitive radio set, it is preferable to make the period of data transmission by the cognitive radio set in the frequency band longer than the carrier sensing time of the licensed terminal. By doing so, it is possible to reduce the probability that transmission by the cognitive radio set may be detected through carrier sensing of the licensed terminal.

Next, a case where the licensed terminal starts transmission without carrying out carrier sensing will be considered. Assuming that the utilization rate of the frequency band by cognitive radio sets is constant, shortening the period and thereby shortening the transmission time within 1 period will reduce interference with the licensed terminal. Shortening the period naturally causes the carrier sensing time to be shortened, and therefore the period can only be shortened to a degree of length during which carrier sensing and modulation analysis can be at least realized.

In this way, by changing the period according to the nature of the licensed system in the frequency band, it is possible to reduce interference with the licensed terminal.

MODIFICATION EXAMPLE 3

Such a method of using different transmission periods for different transmission frequency bands can be performed relatively easily in intermittent transmissions which are not frequency hopping as shown in FIG. 8 and FIG. 7. On the other hand, it is also possible to set different periods for different frequency bands in frequency hopping.

Figure 9:
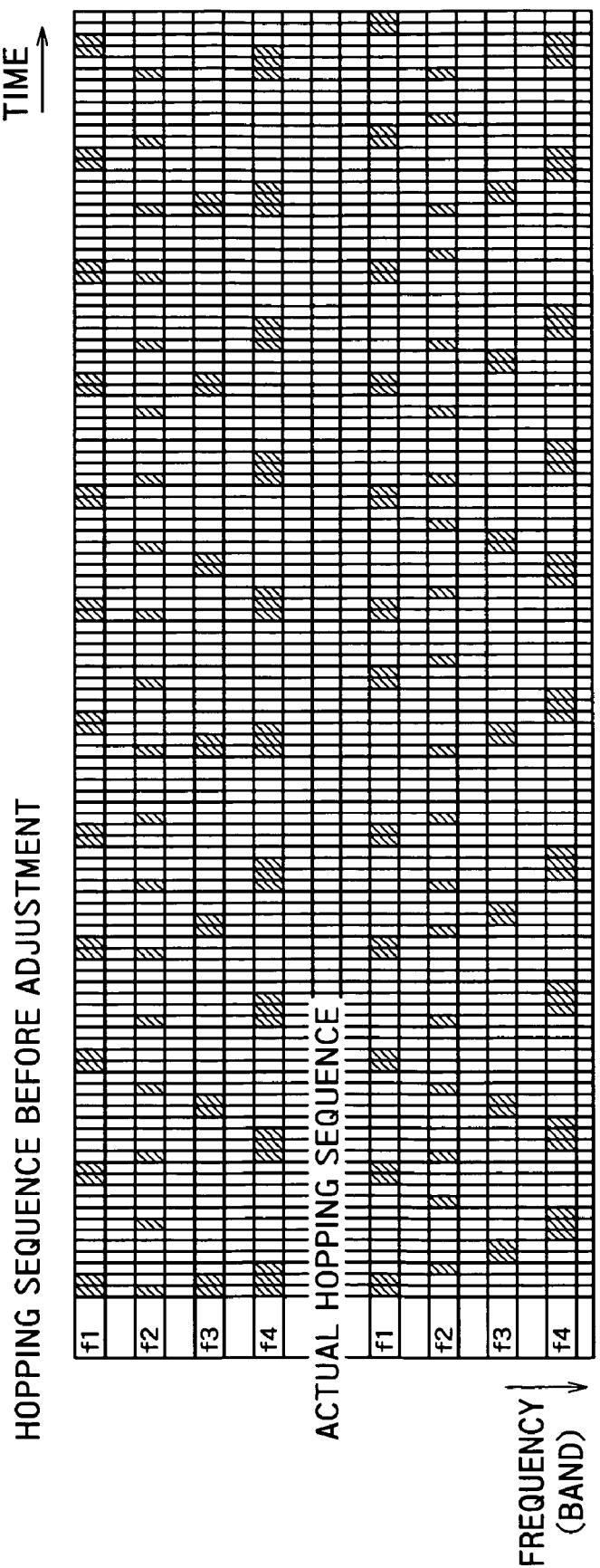
FIG. 9 illustrates an example of a hopping sequence of modification example 3 of the embodiment of the present invention.

FIG. 9 shows an example thereof. FIG. 9 shows an example of transmissions carried out for different periods in 4 frequency bands. Frequency band f1 has a period of 5 (hereinafter, the unit of numerical values is defined arbitrarily) and a continuous transmission time of 1, f2 has a period of 3 and a continuous transmission time of 0.5, f3 has a period 8 and a continuous transmission time of 1, and f4 has a period of 6 and a continuous transmission time of 1.5. When these frequency bands are straightly arranged, this looks like the upper part of FIG. 9 and there are overlapping transmissions and frequency hopping cannot be performed in this condition. Therefore, an algorithm following a certain rule, for example, a rule that when transmissions overlap temporally, transmissions are carried out in ascending order of frequency band numbers assigned to the respective transmission frequency bands and priority is given to earlier transmission scheduled is applied to prevent overlapping and the result of such an adjustment becomes as shown in the lower part of FIG. 9. The temporal utilization rates in the respective transmission frequency bands are 0.2, 0.17, 0.125, 0.25 in that order. The total rate is approximately 0.74 and there is still a margin, and therefore even if transmission timings are shifted to some extent, there will never be such a situation that the sequence cannot be fully fitted in. In FIG. 9, when transmissions overlap, they are basically shifted backward, but when there is no extra margin, transmissions may be shifted forward.

The cognitive radio set according to the embodiment of the invention notifies the receiver before starting a transmission of not only information on the transmission frequency band used (frequency, bandwidth, bit rate, etc.) but also numbers assigned to the respective transmission frequency bands, continuous transmission time and period via the aforementioned control channel, forms a hopping sequence according to the above described known deterministic algorithm, and can thereby carry out transmissions for periods independent of one frequency band to another even using frequency hopping.

At this time, an exact period in each transmission frequency band varies around the first determined period as an average, but in view that the reason for changing periods from one frequency to another is based on the above described consideration of the licensed system, the time of the period need not be completely the same and even if there is a certain level of variation, the effect is the same as far as the average value matches the set value.

When the method as shown in FIG. 9 is adopted, if the licensed terminal starts transmission, the cognitive radio set naturally stops the transmission in that frequency band. At this time, unlike the method in FIG. 2 whereby transmission frequency bands are simply skipped, the way of skipping becomes distorted. However, both the cognitive radio set and the communicating receiver form a sequence according to a known algorithm and create a schedule regarding at what time and at which frequency transmission or reception is carried out. Even if the way of skipping is somewhat distorted, the operation of skipping the frequency band in question is the same, and therefore the problem can be solved using the method of simply skipping transmission/reception of the frequency band. When the transmission frequency band in which transmission is stopped is replace by a spare frequency band, the above described exchange of frequency band numbers is performed in that stage again and in a stage in which both the transmitter and the receiver form a new sequence, the sequence may be shifted to the new sequence.

Here, the period may be determined for the above described reason, but when the own transmission is inserted in a frequency band in which another cognitive radio set is already carrying out transmission as described above, the period may be determined so as to match the period of the already existing transmission to prevent overlapping with that period. In this case, the transmission may be located at a time position where the transmission of the other party and the own period does not overlap even if the period of the other party or the own period is somewhat varied. Furthermore, the sequence determination algorithm may also be provided with an option that priority is given so that the transmission period in that frequency band varies as little as possible.

Since FIG. 9 shows the example with 4 frequency bands for simplicity of explanation, the variation with respect to the period is considerably large, but when many transmission frequency bands are used as shown in FIG. 6 from the standpoint of the utilization rate, the variation in the period does not increase so much.

Figure 10:
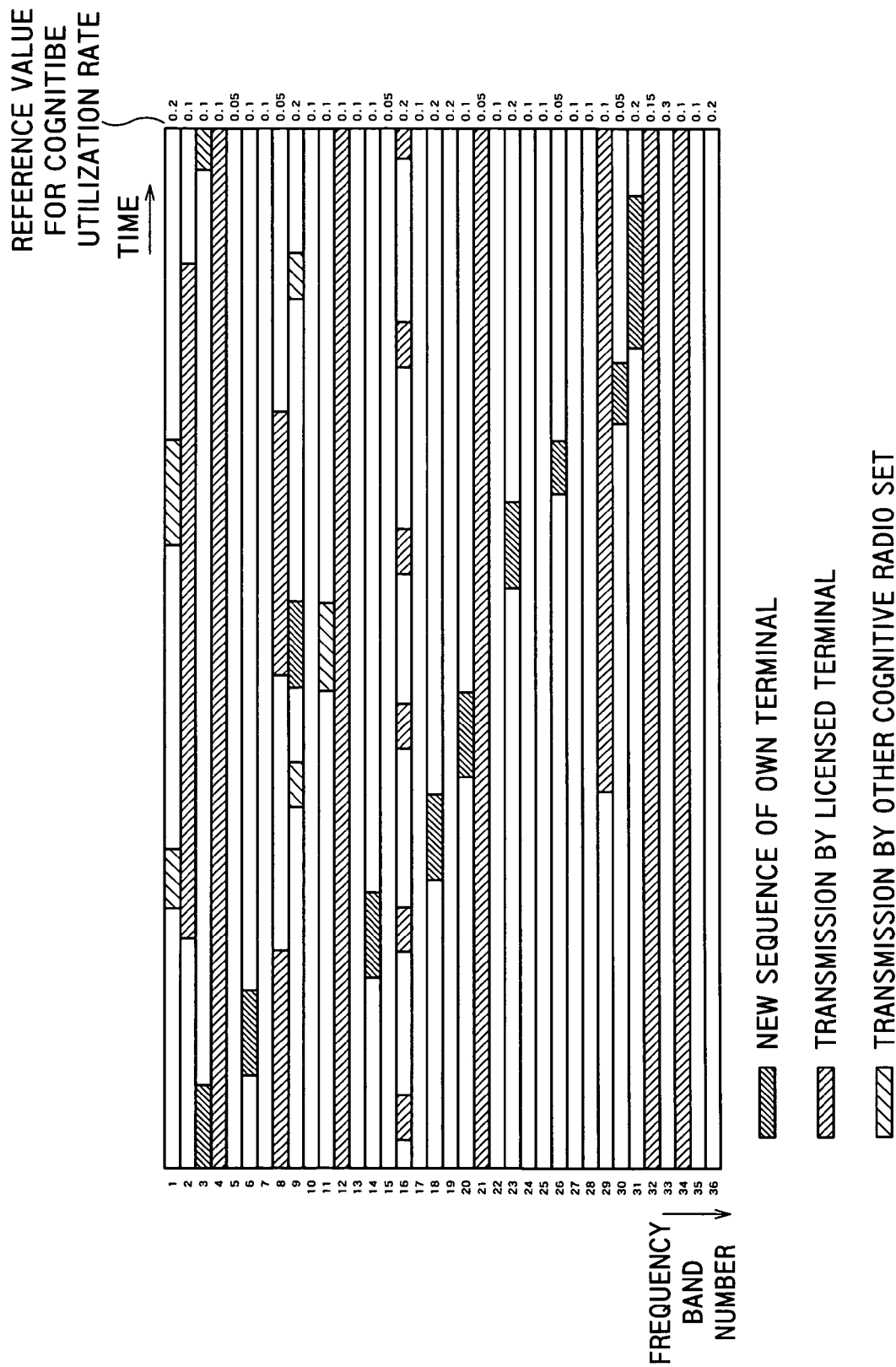
FIG. 10 illustrates an example of a hopping sequence of modification example 3 of the embodiment of the present invention.

In the case where the own transmission is carried out in a frequency band where a transmission is already being carried out by another cognitive radio set, a more preferable method is to carry out the own transmission after transmission of the other cognitive terminal. FIG. 10 shows such an example.

FIG. 10 is based on FIG. 6, but the own transmission is located after transmission by another cognitive radio set in frequency band number 9. In the example in FIG. 10, it is only frequency band number 9 that uses the frequency band in which the other cognitive radio set is already carrying out data transmission. For this reason, the cognitive radio set according to the embodiment of the invention adjusts periods of all transmission frequency bands to be used, for the period of the other cognitive radio set which is carrying out data transmission in frequency band number 9 and one transmission in each transmission frequency band is carried out in 1 period as a whole.

In this way, when the own transmission is scheduled in a frequency band in which transmission is already being carried out by another cognitive radio set, the period is measured beforehand, and in synchronization therewith the own transmission is preferably scheduled after the transmission by the other cognitive radio set. It is of course necessary to insert a sufficient guard interval in preparation for a certain level of period variation.

Other cognitive radio sets are carrying out transmission in a situation as shown in FIG. 10 for example, assuming that there is no other transmission. Therefore, if the own transmission is inserted before that transmission, such an insertion may be detected through carrier sensing by the other cognitive radio set, causing unnecessary confusion against the other cognitive radio set. Moreover, considering that continuous transmission times are variable in their respective transmission frequency bands and hopping sequences need not always be packed densely, it is difficult to know exactly since when the other cognitive radio set has been carrying out carrier sensing in that transmission frequency band. Furthermore, the period in the transmission frequency band may have been set to a period appropriate for the frequency band.

Therefore, periods preferably should not be changed whenever possible and in order to prevent detection by carrier sensing by the other cognitive radio set, the own transmission is preferably located after the transmission by the other cognitive radio set.

As a result, part of transmission by the other cognitive radio set may overlap the own carrier sensing period, producing the possibility that a modulation analysis may not be performed sufficiently. However, if a licensed terminal starts transmission before the transmission by the other cognitive radio set, the other cognitive radio set stops the transmission, and as a result, the own modulation analysis is enabled.

Furthermore, if a licensed terminal starts a transmission while transmission by the other cognitive radio set is in progress, the transmission by the other cognitive terminal is crushed by interference. The modulation analysis section according to the embodiment of the invention has the function of distinguishing the transmission by the licensed terminal from other transmissions, but even in the case of transmission by a radio set other than a licensed terminal, it is possible to detect whether it has been collided by interference or not based on an unnatural variation in power and statistical tendencies. In this case, it is only possible to detect that the transmission is crushed unnaturally, but in the case where the start of transmission from the licensed terminal is doubted even slightly, the cognitive radio set stops the transmission in the frequency band. Since such a case is already taken into consideration as a precondition, no significant detriment is produced.

In this way, locating the own transmission after transmission by the other cognitive radio set can reduce influences on the licensed terminal or influences on other cognitive radio sets.

There may be a case where one transmission frequency band already includes transmissions from a plurality of other cognitive terminals. In such a case, there is a high probability that the respective terminals may be carrying out transmission by coordinating their periods with one another, but however, there may also be a case where intervals between respective transmissions are not constant and periods differ from one transmission to another. In order to handle such a situation, the function of the modulation analysis by the cognitive radio set according to the embodiment of the invention may be designed not only to identify the modulation scheme as described so far but also to detect the contents of transmission by other cognitive radio sets, that is, to detect a frame of PHY (physical layer) or MAC and identify the number of a plurality of other cognitive radio sets. In such a case, when it is desirable to include the own transmission in the same frequency band, it is preferable to detect periods of the respective other cognitive radio sets during channel scanning, cause the own transmission period to synchronize with one of them and locate the own transmission after the transmission of the other cognitive radio set if possible.

MODIFICATION EXAMPLE 4

The cognitive radio set according to the embodiment of the invention may also use a plurality of hopping sequences simultaneously.

Figure 11:
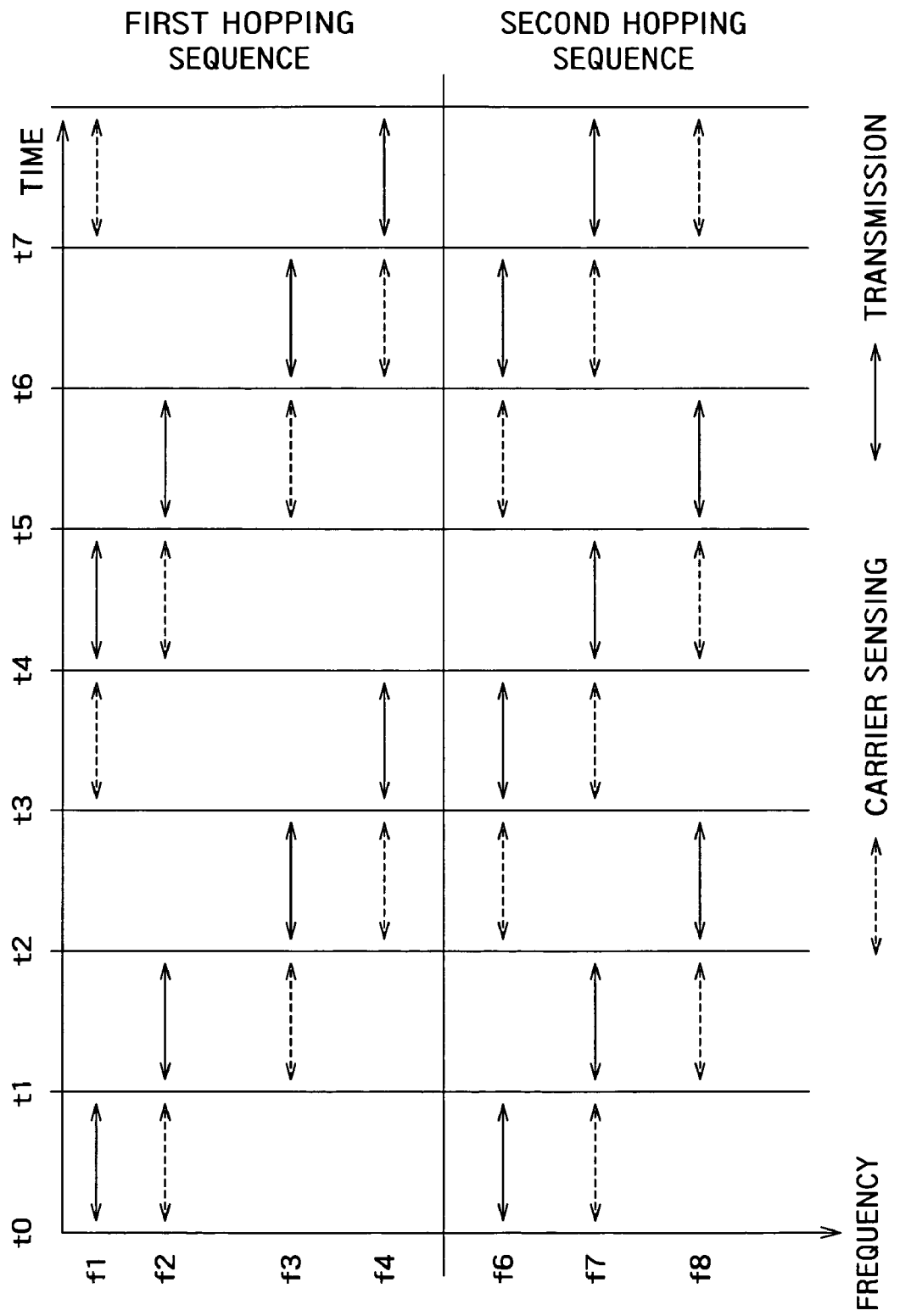
FIG. 11 illustrates an example of operation of modification example 4 of the embodiment of the present invention.

FIG. 11 shows an example thereof. The step of selecting a plurality of transmission frequency bands is the same as that explained so far. Furthermore, most operations such as carrying out carrier sensing in the transmission frequency band immediately before the transmissions in respective sequences and stopping the transmissions when transmission by a licensed terminal is detected, are the same as the operations explained so far. However, the only difference is that a plurality of transmission systems are necessary in order to output a plurality of sequences simultaneously.

In FIG. 11, two hopping sequences; first and second hopping sequences, exist. These hopping sequences are independently repeated as a sequence with four frequency bands and a sequence with three frequency bands respectively. Or by coordinating the periods, the second sequence may also be used with gap time. Basically, the sequence varies depending on the number of transmission systems of cognitive radio sets and the level of bit rate required.

Figure 12:
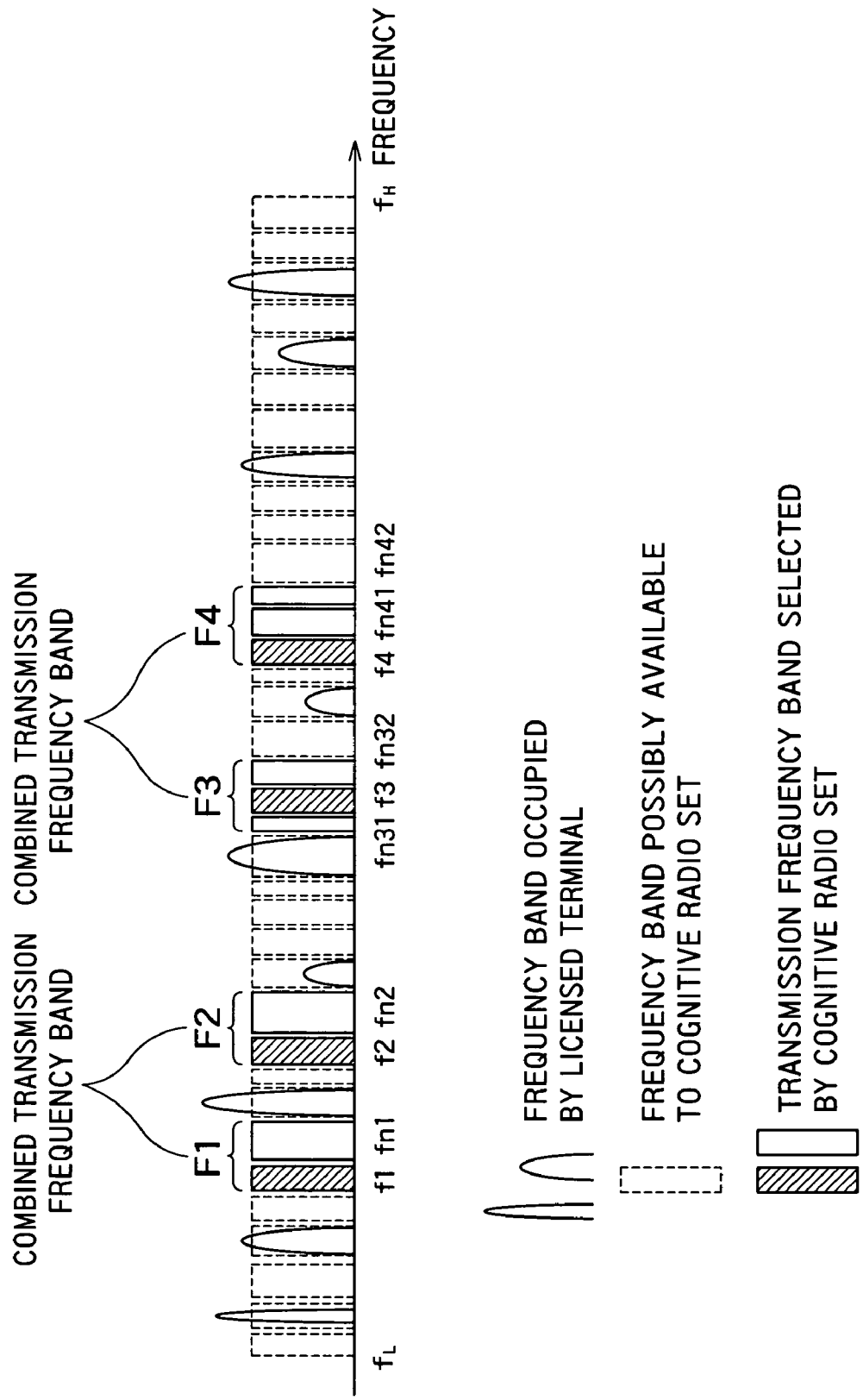
FIG. 12 illustrates an example of a combined frequency band of modification example 4 of the embodiment of the present invention.

Methods of increasing a bit rate include not only increasing the number of sequences in this way, but also combining several adjacent frequency bands into one band and preparing several such combined transmission frequency bands to realize hopping. FIG. 12 shows a situation of frequency combination. Based on FIG. 3, fn1, fn2, fn31, fn32, fn41, fn42 are transmission frequency bands newly selected to increase the bit rate and these frequency bands are combined with the frequency bands from f1 to f4 respectively and used as combined transmission frequency bands of F1 to F4.

In the example of FIG. 12, new frequency bands are selected so that the respective combined transmission frequency bands have substantially the same bandwidth. However, the number of transmission frequency bands enough to support the bit rate necessary for data transmission need to be actually selected and the widths of the combined transmission frequency bands may differ drastically from one another. The procedure up to the selection of these transmission frequency bands is the same as that explained so far.

Frequency hopping is carried out by sending such a signal that spans the whole combined frequency band of F1 for example, as a set of these frequency bands. The operation of the frequency hopping is substantially the same as that explained so far. However, when the period, continuous transmission time or utilization rate is changed depending on the nature of a licensed system, in the situation as shown in FIG. 12, a plurality of licensed systems are included in one combined transmission frequency band, and therefore the period, continuous transmission time or utilization rate is preferably selected according to the most stringent reference out of references with respect to the included licensed systems.

Furthermore, when carrier sensing is performed after a cognitive radio set starts transmission, that carrier sensing is carried out on the combined transmission frequency band and the sampled signals are divided into channels of the respective licensed systems, a modulation analysis is performed on each channel and the presence/absence of transmission from the licensed terminal is detected. These operations are not limited to the situation as shown in FIG. 12, but the same applies to a case where a plurality of licensed systems are included in one transmission frequency band.

When a cognitive radio set is provided with a transmission section capable of outputting a signal over a wideband so as to cover such a combined transmission frequency band, the above expansion of band is possible.

In the cognitive radio set according to the embodiment of the invention, the bandwidth of each frequency band differs from one frequency band to another as shown in FIG. 3. This is intended to allow the cognitive radio set to receive transmission from a licensed terminal without any loss of its bandwidth and perform a more accurate modulation analysis when carrying out carrier sensing and a modulation analysis.

On the other hand, when such a form is adopted, the bandwidth when the cognitive radio set carries out transmission changes with time. This leads not only to a slow variation for each transmission but also to a situation that the bandwidths of all frequency bands of frequency hopping subtly differ from one another. In order to deal with such a situation, for example, it is possible to adopt a method of carrying out transmission in each frequency band using a modulation parameter that matches the bandwidth of the transmission frequency band having the narrowest bandwidth out of a plurality of transmission frequency bands.

However, part of the frequency band is wasted in this method, and it is desirable to realize transmission making most of bandwidths of the respective transmission frequency bands without any waste. For a scheme such as QPSK (Quadrature Phase Shift Keying) in which one carrier is modulated, it is necessary to change the symbol rate in respective transmission frequency bands so as to match the bandwidth which differs from one transmission frequency band to another of frequency hopping. This can be realized by adopting such a form as constructing a transmission section digitally, carrying out clock-synthesizing corresponding to the symbol rate based on a reference clock, modulation and filter processing after modulation by the digital section, and then performing digital/analog conversion and conversion to a radio signal. However, the digital section is required to realize very high-speed processing in terms of clocks as well as processing time.

On the other hand, when a modulation scheme based on frequency division such as OFDM is applied, it is possible to realize shaping of the bandwidth relatively easily. That is, by setting a maximum bandwidth of OFDM to a bandwidth equivalent to or greater than the maximum bandwidth that may be transmitted and setting the amplitude other than that of the subcarriers corresponding to the bandwidths of the respective transmission frequency bands to be actually 0, it is possible to freely vary the bandwidths. However, since the reciprocal of the subcarrier interval is proportional to the symbol length in OFDM, the degree of freedom of the symbol length is low. Therefore, in order to make the continuous transmission time in each transmission frequency band variable as in the configuration according to the embodiment of the invention, it is preferable to take a relatively long continuous transmission time and change the number of symbols included therein instead of changing the symbol length.

MODIFICATION EXAMPLE 5

The above described embodiments have not explained the reception section of a cognitive radio set in detail, but in simplifying the configuration of the cognitive radio set, the carrier sense section preferably shares its most parts with the reception section for data reception and applies TDD (Time Division Duplex) whereby transmission and reception are divided on a time-division basis. Such an embodiment will be explained below.

Figure 13:
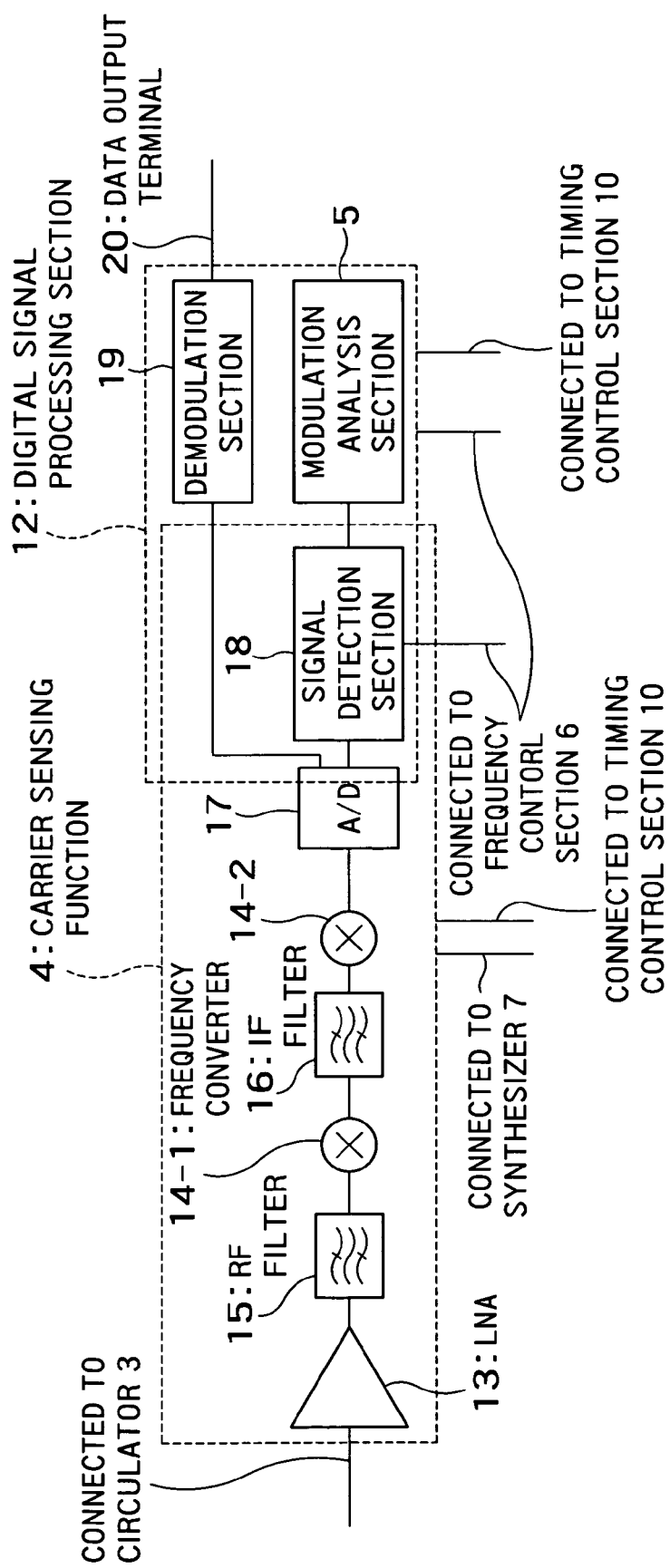
FIG. 13 is a block diagram of a carrier sense section and modulation analysis section of modification example 5 of the embodiment of the present invention.

FIG. 13 shows a detailed block diagram of a carrier sensing/modulation analysis section in a case where the cognitive radio set multiplexes transmission and reception on a TDD basis and the frequency range having transmission capability covers a wideband frequency range exceeding 1 octave. This is an example where the reception section and carrier sense section are shared.

Figure 14:
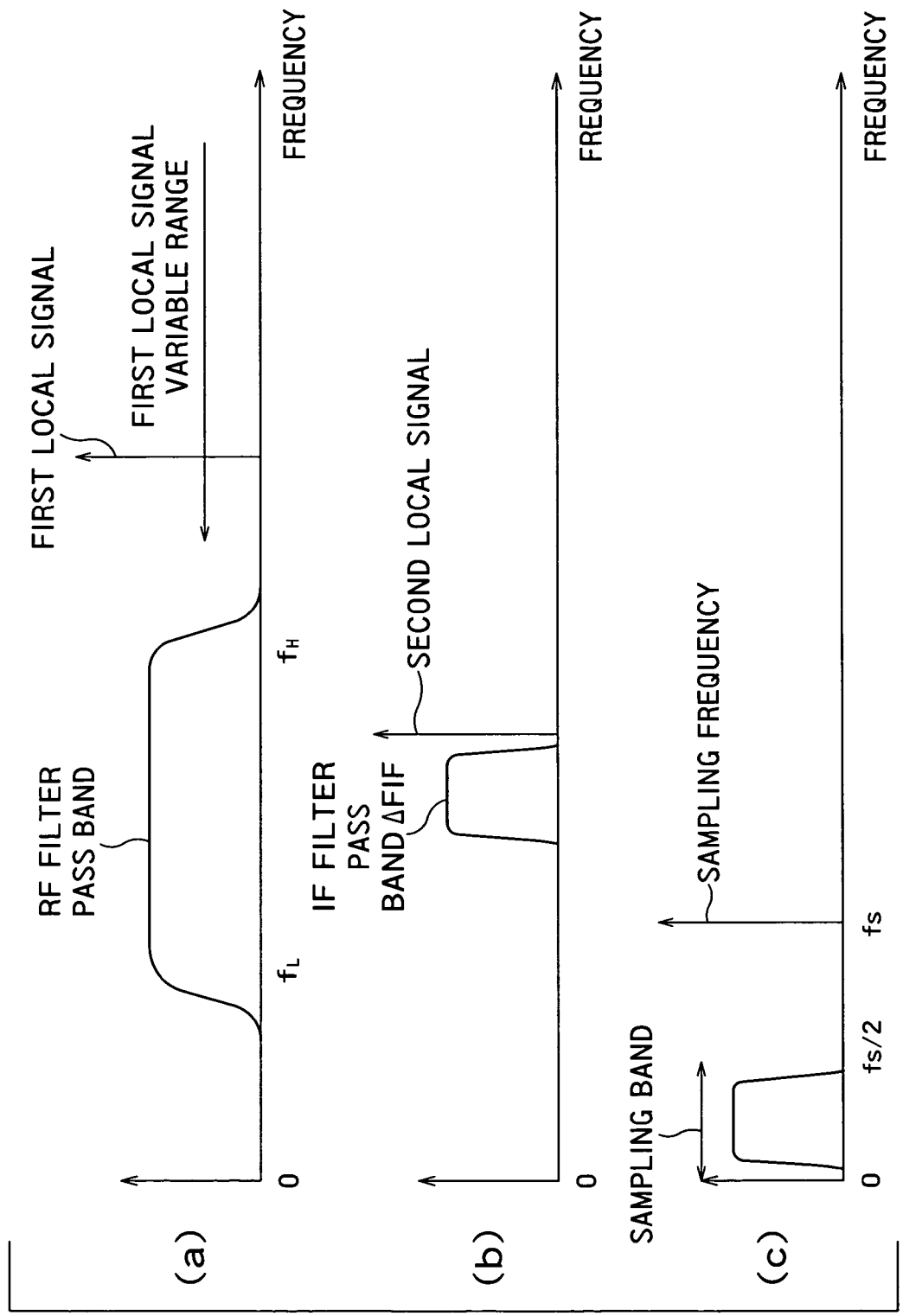
FIG. 14 illustrates operation of modification example 5 of the embodiment of the present invention.

FIG. 14 shows spectrum to illustrate the operation of a cognitive radio set according to the embodiment of the invention. A radio signal inputted from a circulator 3 is amplified by a wideband preamplifier (LNA: Low Noise Amplifier) first. This radio signal is filtered through such a wideband RF (Radio Frequency) filter 15 that the entire frequency range in FIG. 3 is included (FIG. 14(a)) and signals outside the range are removed. This is converted to a first intermediate frequency by a frequency converter 14-1, but at this time, a local signal is set up on the higher frequency side in the frequency range as shown by a first local signal in FIG. 14(a). Therefore, this frequency conversion is not necessarily a down-conversion.

By changing the first local signal, a central frequency of the signal received at that time is selected. The frequency converters 14-1, 14-2 are not mere mixers, but frequency converters including other functions necessary for frequency conversion, for example, a filter for removing an image signal and level adjustment.

The output of the frequency converter 14-1 is band-restricted by an IF (Intermediate Frequency) filter 16 corresponding to a maximum bandwidth of one frequency band (including a combined transmission frequency band) which this cognitive radio set can receive, having a characteristic as shown in FIG. 14(b). This is converted to a low frequency which falls within a sampling bandwidth of an A/D converter 17 as shown in FIG. 14(c) through the frequency converter 14-2 by a second local signal shown in FIG. 14(b) and converted to a digital signal by the A/D converter 17.

The output of the A/D converter 17 is inputted to a signal detection section 18, which detects whether there is some radio signal in a frequency band subject to carrier sensing or not. This and subsequent operations are the same as those in FIG. 1.

During data reception when the radio set operates as a receiver, the output of the A/D converter 17 is inputted to a demodulation section 19, demodulated as appropriate and the data obtained is outputted from a data output terminal 20.

Regarding the processing from the A/D converter 17 onward, the function of the processing may be divided on software-basis in one digital signal processing section 12.

With regard to the quantization bit rate of the A/D converter 17, there is a problem such as tradeoff with power consumption, circuit size and sampling rate and it is generally difficult to use a large value at a high-speed sampling rate in particular. Such a restriction on the quantization bit rate appears as the form of a reduction in the dynamic range when a received signal is digitized. Normally, level control is applied to a signal being received so that a desired signal falls within the dynamic range of the A/D converter.

On the other hand, of the configurations according to the embodiment of the invention, according to the configuration when carrying out frequency hopping in particular, carrier sensing on the transmission frequency band of the next time is carried out while transmission is being carried out in one transmission frequency band. Since transmission and reception are actually being carried out simultaneously, there is a problem that a signal in the transmission leaks into the carrier sense section. In the cognitive radio set according to the embodiment of the invention in particular, there are various bandwidths of transmission frequency band and the A/D converter may have a considerably wide input bandwidth when frequency bands such as a combined transmission frequency band are also included.

Generally, an FDD (Frequency Division Duplex) system that performs transmission and reception simultaneously reduces the influences of the own transmission leaked into reception by limiting the reception bandwidth to a minimum necessary width and eliminating other bandwidths using a sharp filter. In the embodiment of the invention, the bandwidth of the IF filter pass band shown in FIG. 14(b) becomes an input bandwidth to be actually inputted to the A/D converter, but in many cases, this bandwidth is by far wider than the bandwidth of the transmission frequency band being transmitted at that moment or bandwidth of the transmission frequency band subject to carrier sensing in preparation for the next transmission.

On an assumption that a sufficient dynamic range cannot be secured by the A/D converter, if a signal being transmitted by the own radio set leaks into the sampling band, since the own transmission has very large power with respect to the received signal, even such an amount of signal corresponding to the leakage causes the A/D converter to saturate, producing a large amount of distortion components in the frequency around the signal being transmitted. Furthermore, if the input level is optimized for the leakage to prevent distortion, small signals are buried in quantization noise and can no longer be detected, and carrier sensing, which is an important function of the cognitive radio set, cannot possibly be carried out.

Figure 15:
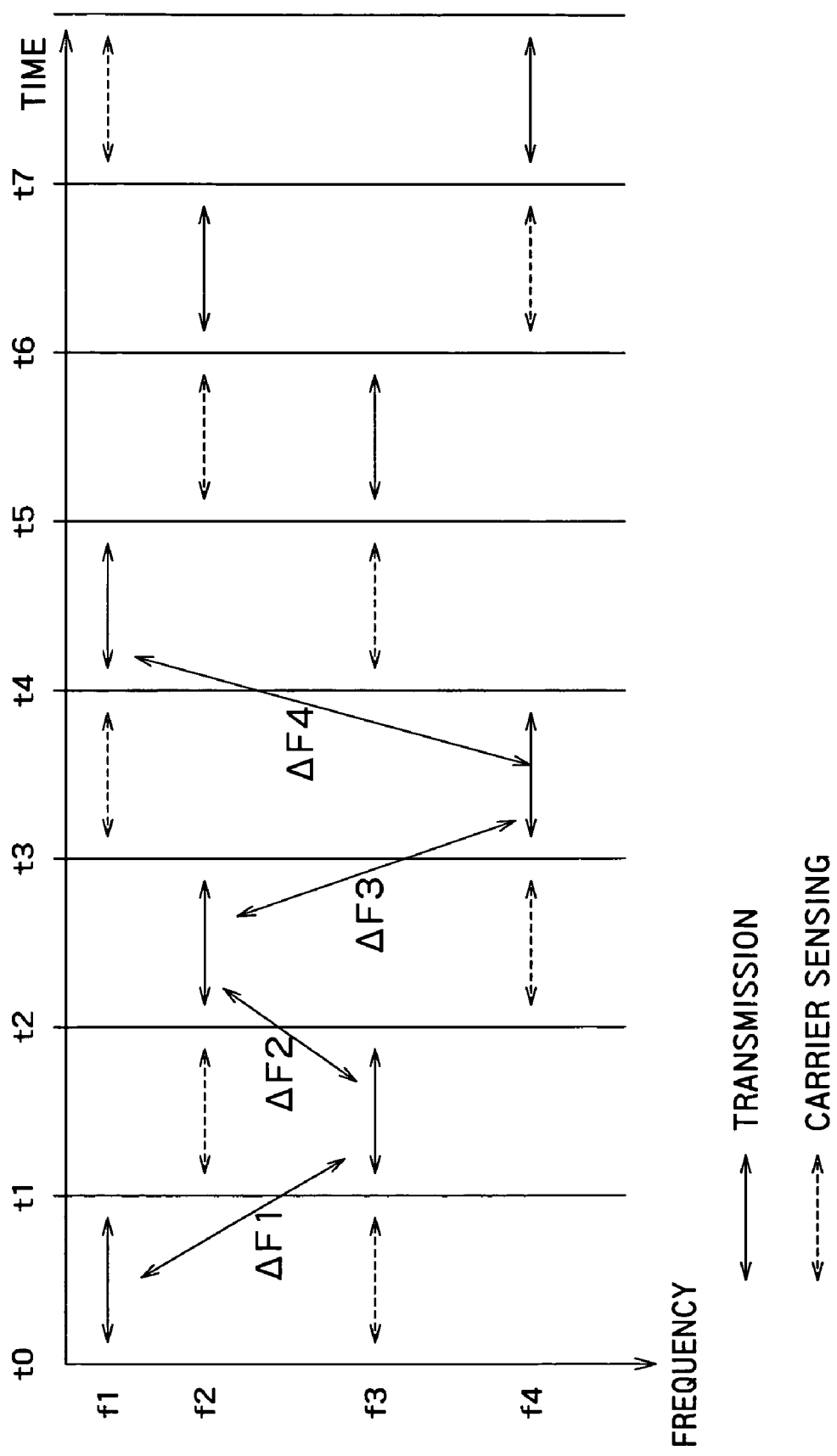
FIG. 15 illustrates an example of a hopping sequence of modification example 5 of the embodiment of the present invention.

Therefore, as shown in FIG. 15, the embodiment of the invention forms a hopping sequence in such a way that temporally adjacent transmission frequency bands in a hopping sequence are spaced apart by more than the bandwidth inputted to the A/D converter. Prior to this, transmission frequency bands which can form such a hopping sequence are selected. That is, in FIG. 15, the frequency differences between temporally adjacent transmission frequency bands are expressed by $\Delta F1$ to $\Delta F4$, but these differences are made to exceed $\Delta FIF$ which is the bandwidth in the IF filter pass band in FIG. 14.

Figure 16:
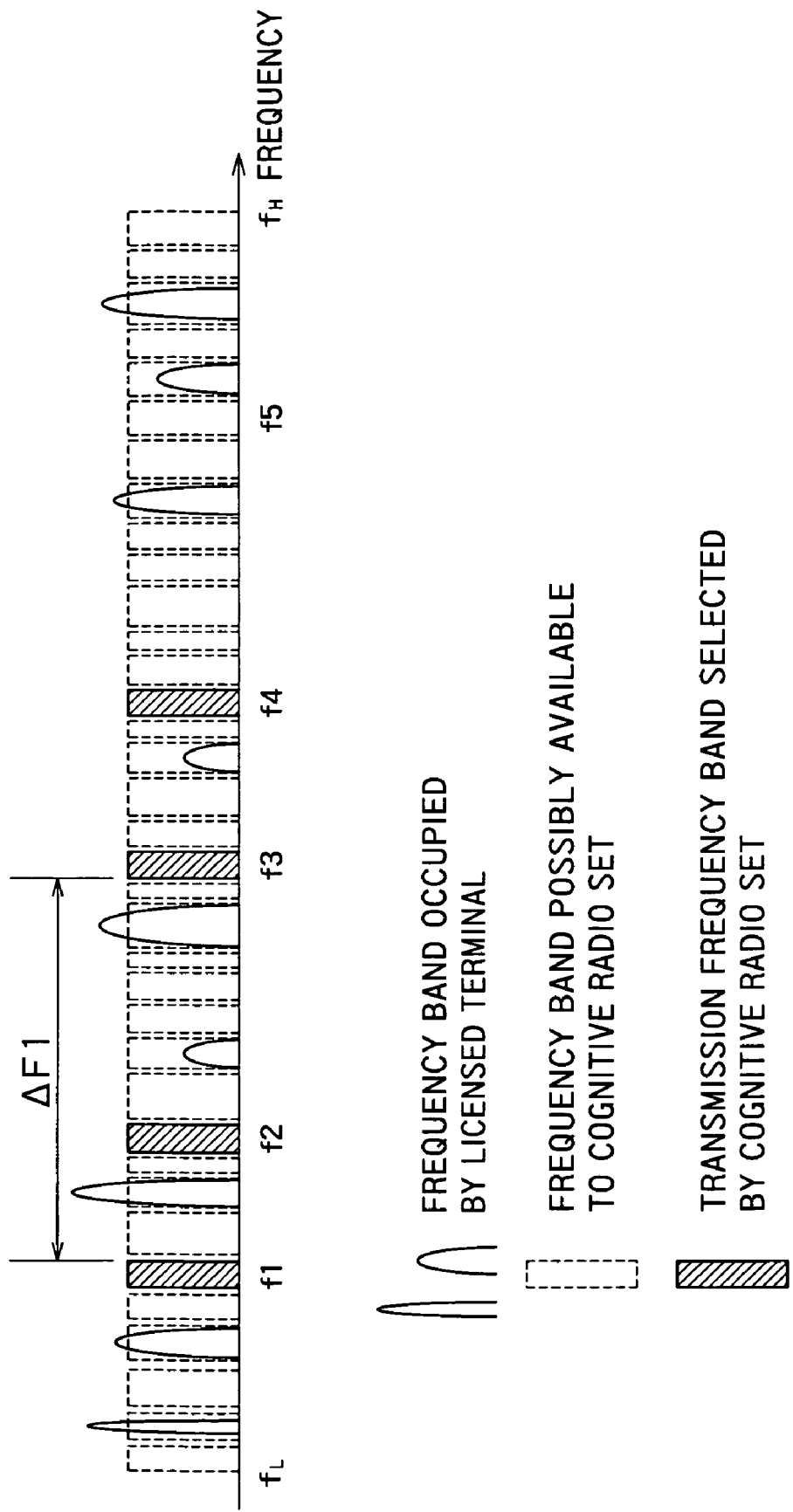
FIG. 16 illustrates an example of a frequency band selection method according to modification example 5 of the embodiment of the present invention.

If there is no large difference in bandwidths of a plurality of transmission frequency bands, $\Delta F1$ to $\Delta F4$ may be equal to the differences in the central frequency of the transmission frequency bands, but if there is a marked difference, the frequency difference may be preferably the frequency difference between near band-ends of those transmission frequency bands, as shown by $\Delta F1$ in FIG. 16. The definitions of a band end and bandwidth follow general definitions and can be determined, for example, by picking up a point by 10 dB below a peak or the like.

By doing so, the frequency of transmission in progress goes out of the input bandwidth of the A/D converter during carrier sensing. Therefore, it is possible to prevent the A/D converter from being saturated due to the leakage of the own transmission and adjust the input level of the A/D converter to the level of a received radio signal and realize excellent carrier sensing/modulation analysis.

Figure 17:
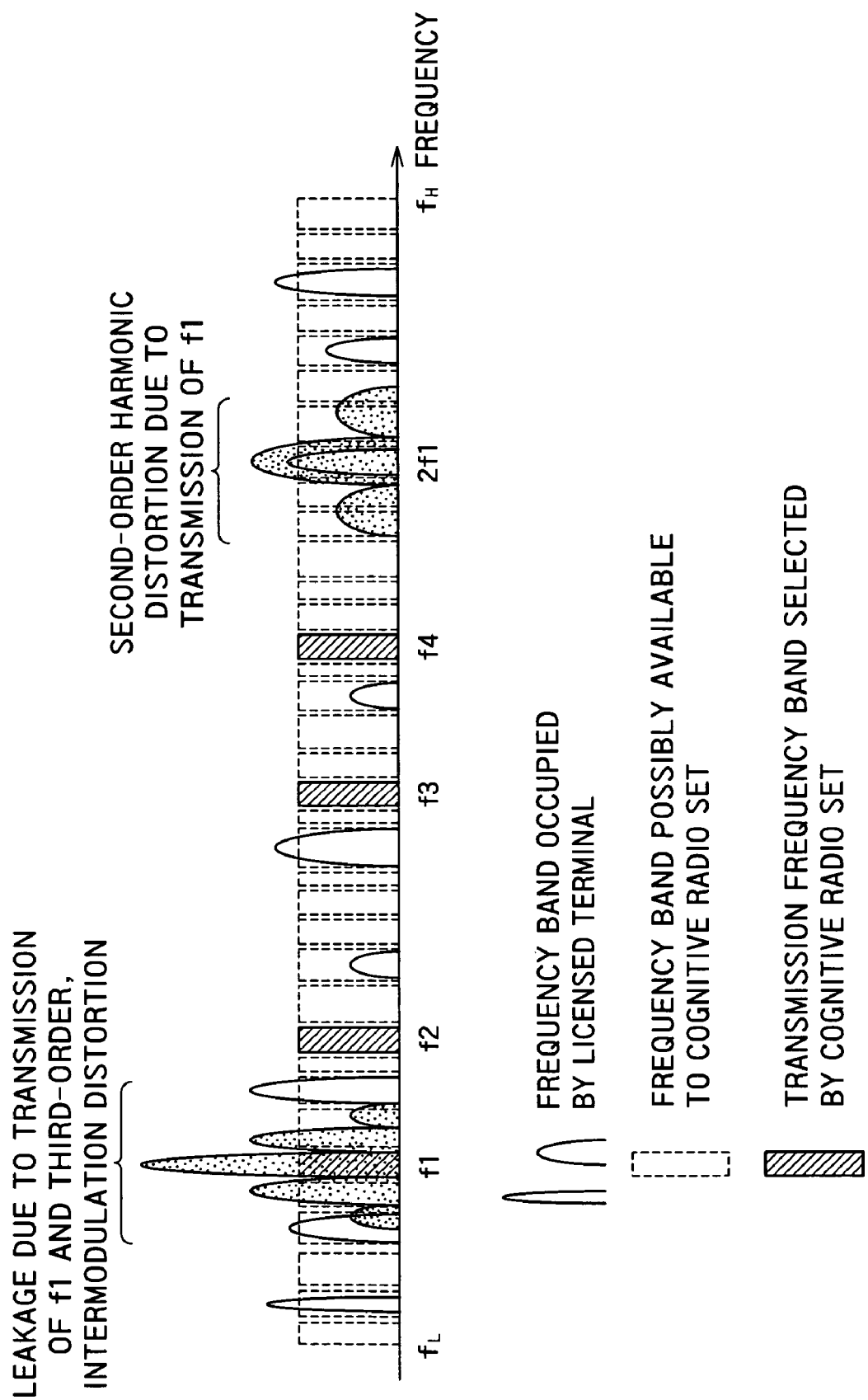
FIG. 17 illustrates LNA distortion.

In addition to the problem of saturation caused by transmission leakage to the A/D converter, there is also a problem with a distortion component of the LNA because the LNA is a wideband amplifier. The LNA having a sufficiently wider dynamic range can be easily applied compared to an A/D converter. However, when the leakage of the transmission signal is very large, generation of some distortion components is unavoidable. FIG. 17 shows that situation.

FIG. 17 shows a situation of distortion generated when transmission being carried out at f1 passes through the LNA. That is, in addition to the leakage of the original signal of f1, adjacent thereto, third-order intermodulation distortion (IM3: Intermodulation 3) outside both ends thereof and fifth-order intermodulation distortion (IM5) further outside thereof are generated. Furthermore, a second-order harmonic distortion caused by f1 and IM3 of f1 is generated in the vicinity of 2f1 which is a second harmonic of f1. When these distortions overlap other received signals, they cause an adverse effect on detection and modulation analysis of the signal.

Thus, as in the case of the A/D converter, as for IM3, IM5, second-order harmonics generated when a signal of one transmission frequency band passes through the LNA, or as for still third-order harmonics if third-order harmonics are generated in the bandwidth of the LNA, the embodiment of the invention places transmission frequency bands not including their frequencies as next transmission frequency band of the hopping sequence. Moreover, this embodiment selects a transmission frequency bands capable of forming such a sequence beforehand. As in the case of the A/D converter, the last transmission frequency band and the first transmission frequency band of the hopping sequence are also made to satisfy a similar relationship. The sequence in FIG. 15 also satisfies such a condition required from distortion of the LNA simultaneously.

By doing so, it is possible to realize high-quality carrier sensing/modulation analysis without deterioration of the carrier sensing performance due to leakage of the own transmission and detect a licensed terminal which is an important function of the cognitive radio set with a high accuracy.

The sequence in FIG. 15 is a sequence made up of four frequencies and it is relatively easy to select transmission frequency bands that satisfy such a relationship and form a hopping sequence. Basically, it is possible to realize the formation of a hopping sequence using a procedure of selecting transmission frequency bands at the largest possible distance, arrange them in such a way that the frequency difference between temporally adjacent transmission frequency bands increases, calculating the frequencies of distortion components, and when the distortions overlap, reselecting around the overlapping transmission frequency band, frequency bands of which distortions do not overlap.

Figure 18:
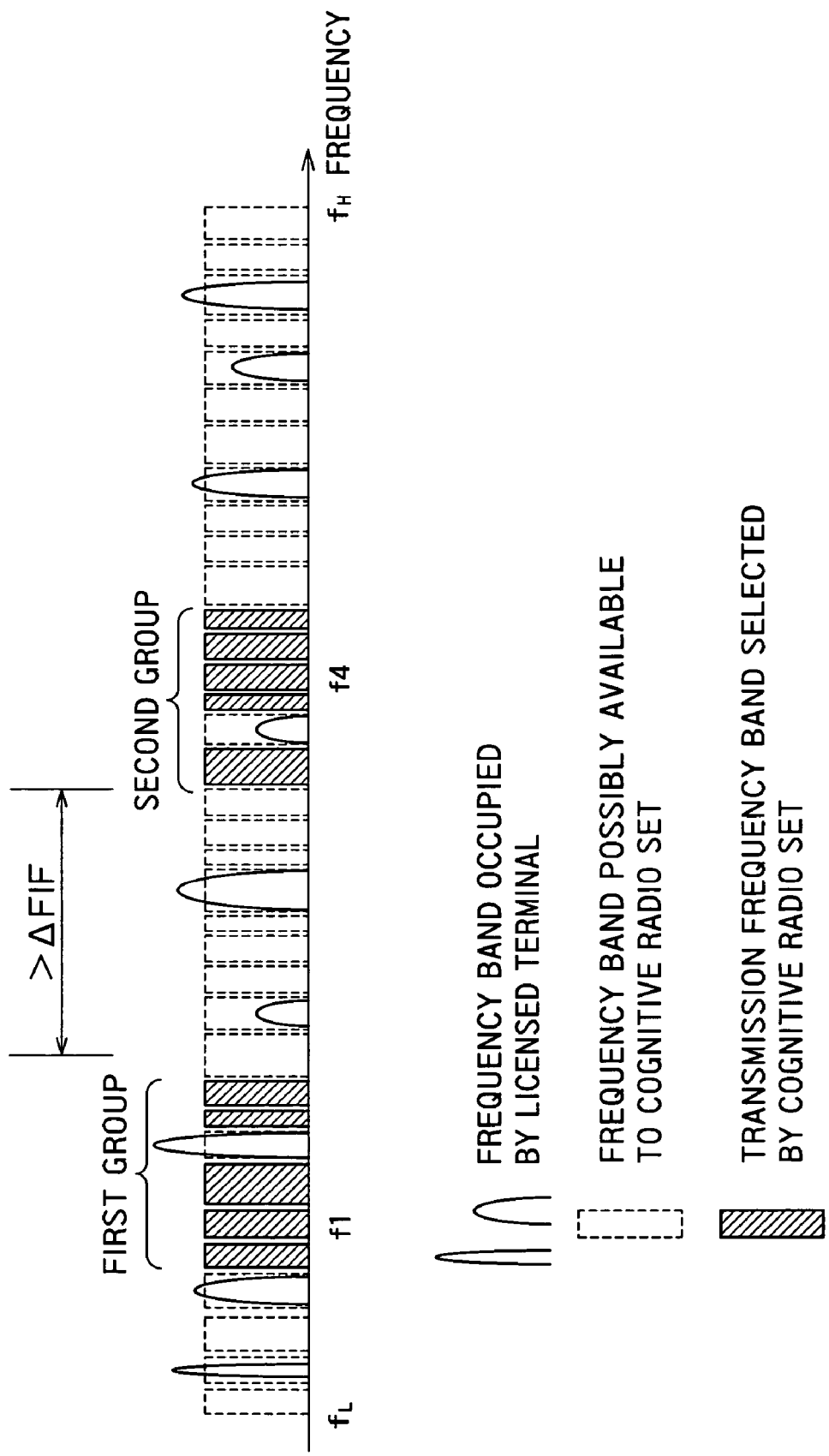
FIG. 18 illustrates an example of a frequency band selection method of modification example 5 of the embodiment of the present invention.

However, when many transmission frequency bands as shown in FIG. 6 are used, scheduling a sequence that satisfies conditions using such a procedure takes time. Therefore, as shown in FIG. 18, two or more (two in FIG. 18) frequency bands which satisfy these conditions and are sufficiently spaced apart from each other are selected first and then a plurality of frequency bands that can be selected from their peripheral frequency bands as transmission frequency bands are selected and grouped. In the case of FIG. 18, half of the transmission frequency bands required as a whole are selected for each group. These groups are referred to as a "first group" and "second group" respectively.

Figure 19:
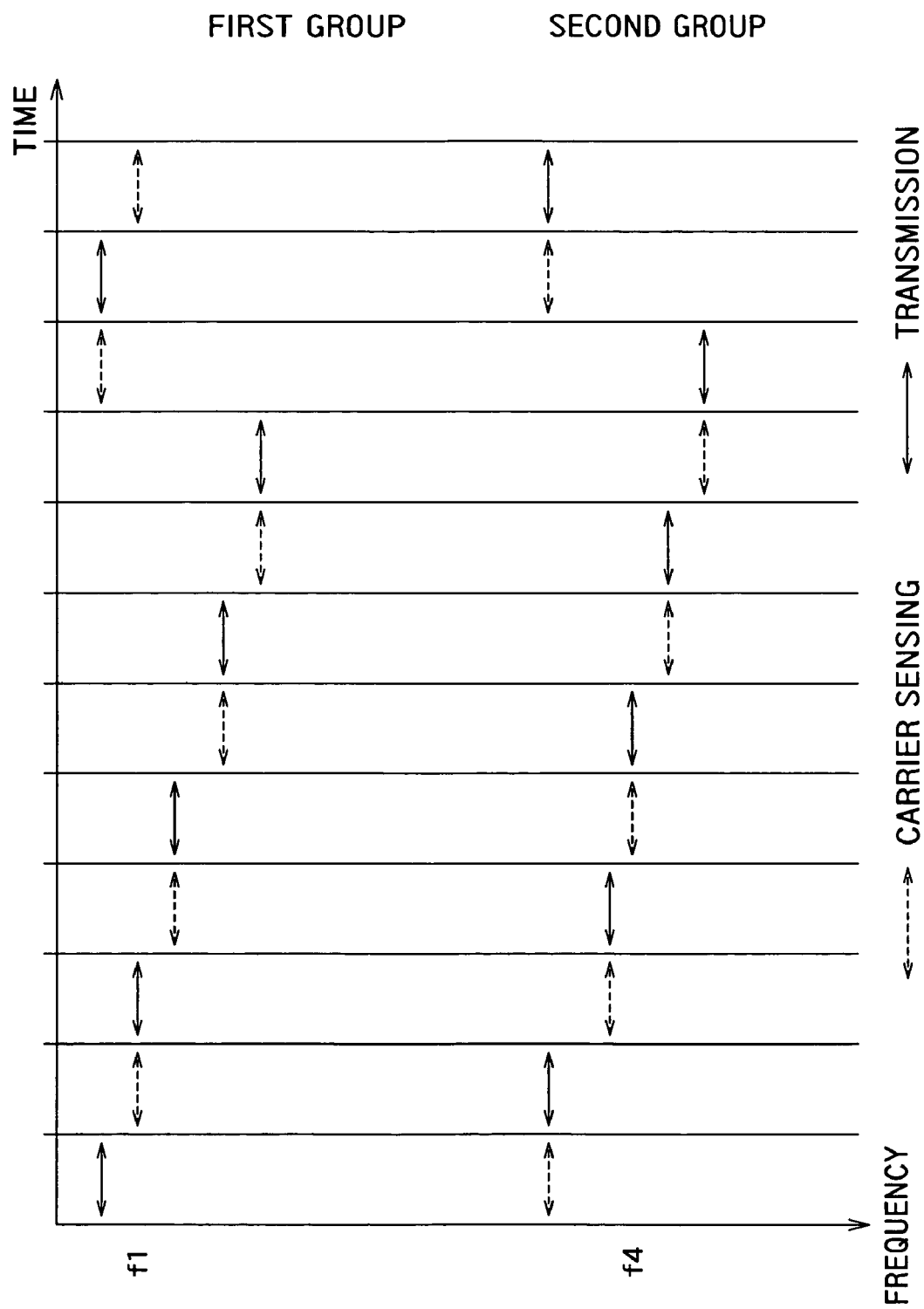
FIG. 19 illustrates operation of modification example 5 of the embodiment of the present invention.

Then, as shown in FIG. 19, the sequence that satisfies the above described condition can be easily configured by selecting and arranging transmission frequency bands from the first and second groups alternately. As shown in FIG. 19, two sets are normally enough, but it is also possible to select two or three frequency bands from around f1 to f4 respectively in FIG. 16, combine them to create three or more groups and select frequency bands from these groups sequentially and place them.

In order to form such a hopping sequence, it is preferable to select transmission frequency bands beforehand which allow such sequence formation when carrying out channel scanning and selecting a plurality of transmission frequency bands.

The embodiment of the present invention takes a relatively long time to carry out channel scanning in order to make sure that there is no usage by any licensed terminal. Therefore, it is preferable to minimize the number of frequency bands on which channel scanning is carried out and speedily shift to a transmission operation when a necessary number of transmission frequency bands are secured to minimize the possibility that the state of a frequency band subjected to previous channel scanning may be changed while channel scanning on other frequency bands is in progress.

In order to form a hopping sequence that satisfies the above described specific frequency conditions (temporally neighboring transmission frequency bands are spaced apart from each other by at least the bandwidth of the A/D converter in a hopping sequence, or frequency band in which distortions of the LNA do not overlap or the like), it is preferable to assume such a sequence at the time of channel scanning and carry out channel scanning on frequency bands that satisfy such conditions. Examples of such channel scanning methods will be shown below.

One relatively simple method (referred to as a "first method") is to select frequency bands according to the order in the sequence and carry out channel scanning. First, any one frequency band is selected and subjected to channel scanning. If the channel scanning result shows that it is not usable, another arbitrary frequency band is subjected to channel scanning. If the channel scanning result shows that it is usable, this is considered as a first transmission frequency band of the sequence (referred to as a "transmission frequency band 1").

Next, a frequency range that satisfies the above described specific frequency conditions is obtained through a calculation on the transmission frequency band 1. That is, a frequency band which is spaced apart from the transmission frequency band 1 by more than the input bandwidth of the A/D converter is obtained through a calculation, or the frequency of harmful distortion components of the transmission frequency band 1 is calculated and a frequency range that does not include those distortion components is obtained through a calculation. It is also possible to obtain a frequency range that satisfies these both conditions.

Next, any one frequency band is selected from among frequency bands included in the frequency range that satisfies such conditions and subjected to channel scanning. If the channel scanning result shows that it is not usable, another frequency band that satisfies the frequency condition is selected and subjected to channel scanning. If the channel scanning result shows that it is usable, this is determined as the next transmission frequency band (referred to as a "transmission frequency band 2") of the sequence. Hereafter, the frequency of the transmission frequency band 1 is replaced by the frequency of the transmission frequency band 2 and the above described selection operation is repeated until the necessary sequence is formed.

At this time, when there is no more frequency band that matches the conditions in the middle of the process, it is possible to do the operation again by moving one step back in the sequence, selecting another frequency band and scanning it. That is, when there is no more frequency band candidate to be a transmission frequency band n which is the nth transmission frequency band of the sequence, the operation is done again by selecting a frequency band different from the already selected frequency band as a transmission frequency band n−1 and subjecting it to channel scanning. At this time, when it is not possible to determine the transmission frequency band n no matter what frequency band may be used as the transmission frequency band n−1, the operation is done again by moving back to a selection of transmission frequency band n−2 and selecting it again.

Another method in the case where there are no more frequency bands that match the conditions in the middle of selection of frequency bands is to move the process back to the transmission frequency band 1 and select it again regardless of the number of already determined transmission frequency bands.

As a further method (second method), the following method is available, for example. First, the number of frequency band candidates that can satisfy the frequency condition with respect to all frequency bands included in the frequency bands having transmission capabilities and that can be located next in the sequence is calculated. Then, channel scanning is carried out on the frequency band having a largest number of candidates and if the frequency band is judged to be usable, the frequency band is considered as the first transmission frequency band (transmission frequency band 1) of the sequence. If the frequency band is judged not to be usable, channel scanning is carried out on the frequency band having the next largest number of candidates. Such processing is repeated until the transmission frequency band 1 can be determined.

Next, once the transmission frequency band 1 has been determined, with respect to candidates of the next already calculated transmission frequency band 2, the number of candidates of further next transmission frequency band is calculated in the same way as for the above described processing and channel scanning is also carried out in descending order of the number of candidates and the transmission frequency band 2 is determined. Such processing is repeated until the necessary sequence is formed.

In this case, since channel scanning is carried out in descending order of the number of candidates for the frequency band to be the next transmission frequency band, a situation that no usable frequency band is found hardly occurs. However, if any usable frequency band is still not found, it is preferable to carry forward the process while moving back in the same way as the first method.

In the above described second method, the number of candidates for the next transmission frequency band is used as a reference for the sequence of channel scanning. However, in the case where an approximate frequency of usage of the licensed terminals of each frequency band and utilization rate or the like are given and the success rate of channel scanning can be predicted, it is also possible to determine the order of channel scanning using the total value of the predicted success rate about the next transmission frequency band candidates as a reference. By doing so, a situation that no usable frequency band is found is even less likely to occur.

When a plurality of groups are formed of transmission frequency bands that satisfy the frequency conditions as shown in FIG. 18, transmission frequency bands are sequentially selected and arranged from the respective groups to thereby form a sequence, the following method is available in the step of selecting transmission frequency bands.

First, as a simple method, in the above described first method, when bands are selected up to transmission frequency band m−1 which is 1 minus the number of groups (e.g., m) from the start of the sequence, the next transmission frequency band m is selected in such a way that the condition determined from the transmission frequency band m−1 is satisfied and at the same time the transmission frequency band 1 substantially satisfies the condition determined from the transmission frequency band m. When the transmission frequency band m is selected, then a transmission frequency band m+1 can be selected from frequency bands close to the transmission frequency band 1.

Selecting the transmission frequency band m such that the transmission frequency band m satisfies the condition from the transmission frequency band m−1 and at the same time the transmission frequency band 1 satisfies the condition from the transmission frequency band m seems apparently complicated, but it would be very simple if the number of groups is 2. If the transmission frequency band 1 is spaced apart from the transmission frequency band 2 by at least the input bandwidth of the A/D converter, the transmission frequency band 2 is likewise spaced apart from the transmission frequency band 1 by at least the input bandwidth of the A/D converter.

Furthermore, since the frequencies of IM3, IM5 need only to be sufficiently spaced apart from the vicinity of the transmission frequency band 1, the opposite holds true likewise. Furthermore, since the third-order harmonic and fifth-order harmonic appear on the high frequency side, if the transmission frequency band 2 is selected on the high frequency side with respect to the transmission frequency band 1, the third-order harmonic, fifth-order harmonic of the transmission frequency band 2 have no effect on the transmission frequency band 1. As described above, when the number of groups is two, it is possible to quite simply select a plurality of transmission frequency bands.

A still further method (third method) is to calculate approximate frequencies of groups that satisfy the condition of the frequency beforehand and store it and carry out channel scanning so that a necessary number of transmission frequency bands are selected in the vicinity of the frequency. At this time, several sets of such frequencies are stored and if the channel scanning result shows that the necessary number of transmission frequency bands have not been selected successfully, it is possible to perform the operation over again with another set of frequencies.

Furthermore, it is also possible, for example, to scan all frequency bands in quite a short period of time at the beginning of the step of selecting a transmission frequencies, grasp an approximate situation of use, carry out channel scanning on frequency bands in the vicinity of frequencies that match any one of the aforementioned pre-stored set of frequencies and in the vicinity of areas where the short-term scanning result shows that frequency bands unoccupied by licensed terminals are concentrated and determine a necessary number of transmission frequency bands. Thus, by carrying out a short-term scanning beforehand, it is possible to increase a success rate of channel scanning to a certain extent and shorten the time required to select a transmission frequency band.

What is claimed is:

1. A radio terminal which carries out data transmission using a plurality of frequency bands including frequency bands licensed to other licensed radio terminals, comprising:
   a detection section configured to detect a radio signal for each frequency band;
   a judging section configured to carry out a modulation analysis by sampling the detected radio signal and calculating frequency and time statistical values of the detected radio signal; to judge, based on a pattern recognition method, whether or not the calculated statistical values match statistical features of a modulation scheme of a licensed radio terminal; and thereby to judge whether the detected radio signal is a radio signal from a licensed radio terminal or not;

a selection section configured to select frequency bands in which periods that no radio signal from licensed radio terminals are detected are equal to or exceed a first threshold and in which frequency band utilization rates by unlicensed radio terminals are equal to or lower than a second threshold, as a plurality of frequency bands to be used for data transmission based on the judgment result;

a schedule generation section configured to generate a schedule for intermittent data transmissions using the plurality of selected frequency bands by determining a continuous data transmission time in each intermittent data transmission such that the utilization rate falls to or below the second threshold for each of the selected frequency bands;

a data generation section configured to generate data for the intermittent data transmissions;

a data transmission section configured to transmit the generated data according to the schedule;

a carrier sensing section configured to carry out carrier sensing on a frequency band in which data is transmitted before data transmission for each of the intermittent data transmissions; and a control section configured to stop, when the carrier sensing result shows that a radio signal from a licensed radio terminal is detected in a certain frequency band, data transmission using at least the certain frequency band.

2. The radio terminal according to claim 1, wherein the second threshold corresponding to the utilization rate is determined for each the frequency band.

3. The radio terminal according to claim 1, wherein the second threshold corresponding to the utilization rate is determined based on interference tolerance of the licensed radio terminals in the each frequency band.

4. The radio terminal according to claim 1, wherein the second threshold corresponding to the utilization rate is determined based on a frequency of usage of the frequency band by the licensed radio terminals in the each frequency band.

5. The radio terminal according to claim 1, wherein the schedule generation section determines a continuous data transmission time in the intermittent data transmissions according to interference tolerance of the licensed radio terminal for each the selected frequency band.

6. The radio terminal according to claim 1, wherein the schedule generation section generates a data transmission schedule in each frequency band so that periodical data transmission is carried out for each the selected frequency band.

7. The radio terminal according to claim 6, wherein the schedule generation section determines a data transmission period in the periodical data transmission for each the selected frequency band.

8. The radio terminal according to claim 1, wherein for a frequency band of the selected frequency bands for which the licensed radio terminals have carrier sensing functions, the schedule generation section generates a data transmission schedule of the frequency band so that data transmission is performed in a period longer than the carrier sensing time of the licensed radio terminals.

9. The radio terminal according to claim 1, wherein for a frequency band in which another unlicensed radio terminal is transmitting a radio signal with a period, the schedule generation section generates a data transmission schedule in the frequency band so that data transmission is performed in synchronization with the period.

10. The radio terminal according to claim 1, wherein the data transmission synchronized with the unlicensed radio terminal is performed after the transmission of the radio signal by the unlicensed radio terminal and before carrier sensing by the unlicensed radio terminal.

11. The radio terminal according to claim 1, wherein
the schedule generation section generates a data transmission schedule of each frequency band so as to perform intermittent data transmissions through frequency hopping using the plurality of selected frequency bands, and
the carrier sensing section carries out carrier sensing to be carried out before data transmission in each frequency band during data transmission scheduled for a time immediately preceding the data transmission in the frequency band.

12. The radio terminal according to claim 11, wherein the schedule generation section generates a data transmission schedule in each frequency band so that an interval between two frequency bands to be transmitted in succession temporally is wider than an input bandwidth of an analog/digital converter of the detection section for detecting the radio signal.

13. The radio terminal according to claim 12, wherein based on frequency differences between at least two predetermined frequencies and the plurality of selected frequency bands, the schedule generation section performs grouping by selecting frequency bands from the selected frequency bands for each of the at least two predetermined frequencies, and the two frequency bands to be transmitted in succession temporally are selected from frequency bands of different groups respectively.

14. The radio terminal according to claim 1, wherein
a judgment threshold is set in the judging section such that a probability that a licensed terminal is erroneously judged as a non-licensed terminal is smaller than a probability that a terminal other than a licensed terminal is erroneously judged as a licensed terminal.

* * * * *